(12) United States Patent
Olekas et al.

(10) Patent No.: US 10,228,439 B1
(45) Date of Patent: Mar. 12, 2019

(54) MOTION DETECTION BASED ON FILTERED STATISTICAL PARAMETERS OF WIRELESS SIGNALS

(71) Applicant: Cognitive Systems Corp., Waterloo (CA)

(72) Inventors: Christopher Vytautas Olekas, Breslau (CA); Yunfeng Piao, Kitchener (CA); Stephen Arnold Devison, Kitchener (CA)

(73) Assignee: Cognitive Systems Corp., Waterloo, Ontario ( * ) Notice: Subject to any disclaimer, the term of this patent is extended or adjusted under 35 U.S.C. 154(b) by 0 days.

(21) Appl. No.: 15/799,806

(22) Filed: Oct. 31, 2017

(51) Int. Cl.
| | | |
|---|---|---|
| *G01S 19/14* | (2010.01) | |
| *G01S 5/02* | (2010.01) | |
| *G01S 13/56* | (2006.01) | |
| *G06F 17/14* | (2006.01) | |
| *G06F 17/18* | (2006.01) | |
| *G01S 19/13* | (2010.01) | |
| *G01S 13/58* | (2006.01) | |

(52) U.S. Cl.
CPC ............ *G01S 5/0278* (2013.01); *G01S 13/56* (2013.01); *G06F 17/142* (2013.01); *G01S 13/58* (2013.01); *G01S 19/13* (2013.01); *G06F 17/18* (2013.01)

(58) Field of Classification Search
CPC ........ G01S 5/0278; G01S 13/56; G01S 13/58; G01S 19/13; G06F 17/142
USPC ............................................ 342/451, 357.51
See application file for complete search history.

(56) References Cited

U.S. PATENT DOCUMENTS

| | | | |
|---|---|---|---|
| 3,996,590 A | * | 12/1976 | Hammack ............... G01S 1/302 342/107 |
| 4,054,879 A | | 10/1977 | Wright et al. |
| 4,075,573 A | | 2/1978 | Kennedy et al. |
| 4,193,055 A | | 3/1980 | Barnum |
| 4,225,858 A | | 9/1980 | Cole et al. |
| 4,286,260 A | | 8/1981 | Gershberg et al. |
| 4,649,388 A | | 3/1987 | Atlas |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

USPTO; Restriction Requirement dated Jan. 23, 2018, in U.S. Appl. No. 15/706,295.

(Continued)

*Primary Examiner* — Chuong P Nguyen
(74) *Attorney, Agent, or Firm* — Henry Patent Law Firm PLLC

(57) ABSTRACT

In a general aspect, motion is detected based on statistical parameters of received wireless signals. In some aspects, signals are obtained. The signals are based on wireless signals transmitted through a space and received at a wireless communication device. Values of a set of statistical parameters are computed for each signal, and filtered values are obtained by applying a filter to the values of the statistical parameters. The filter includes parameters based on a signal quality analysis of the wireless signals. A motion detection process is executed to determine, based on the filtered values, whether an object moved in the space.

30 Claims, 14 Drawing Sheets

(56) References Cited

U.S. PATENT DOCUMENTS

| | | | |
|---|---|---|---|
| 4,740,045 | A | 4/1988 | Goodson et al. |
| 4,870,663 | A | 9/1989 | Kulju et al. |
| 5,270,720 | A | 12/1993 | Stove |
| 5,519,400 | A | 5/1996 | McEwan |
| 5,696,514 | A | 12/1997 | Nathanson et al. |
| 6,075,797 | A | 6/2000 | Thomas |
| 6,380,882 | B1* | 4/2002 | Hegnauer ............ G01S 13/348 340/554 |
| 6,493,380 | B1 | 12/2002 | Wu et al. |
| 6,573,861 | B1 | 6/2003 | Hommel et al. |
| 7,047,015 | B2 | 5/2006 | Hawe |
| 7,295,109 | B2 | 11/2007 | Kobayashi |
| 7,317,419 | B2 | 1/2008 | Sugar et al. |
| 7,652,617 | B2 | 1/2010 | Kurtz et al. |
| 7,916,066 | B1 | 3/2011 | Osterweil |
| 8,138,918 | B2 | 3/2012 | Habib |
| 8,331,498 | B2 | 12/2012 | Huang et al. |
| 8,477,750 | B2 | 7/2013 | Agarwal et al. |
| 8,710,984 | B2* | 4/2014 | Wilson ............ G08B 13/187 340/539.23 |
| 8,818,288 | B2 | 8/2014 | Patwari et al. |
| 8,836,344 | B2 | 9/2014 | Habib et al. |
| 9,030,321 | B2 | 5/2015 | Breed |
| 9,143,413 | B1 | 9/2015 | Manku et al. |
| 9,143,968 | B1 | 9/2015 | Manku et al. |
| 9,523,760 | B1 | 12/2016 | Kravets et al. |
| 9,524,628 | B1* | 12/2016 | Omer ............ G08B 13/2491 |
| 9,551,784 | B2 | 1/2017 | Katuri |
| 9,584,974 | B1 | 2/2017 | Omer et al. |
| 9,743,294 | B1 | 8/2017 | Omer et al. |
| 9,927,519 | B1* | 3/2018 | Omer ............ H05K 999/99 |
| 9,933,517 | B1* | 4/2018 | Olekas ............ G01S 13/538 |
| 9,989,622 | B1* | 6/2018 | Griesdorf ............ G01S 5/02 |
| 10,004,076 | B1* | 6/2018 | Griesdorf ........ H04W 72/0453 |
| 2001/0046870 | A1 | 11/2001 | Stilp et al. |
| 2003/0007473 | A1 | 1/2003 | Strong et al. |
| 2003/0108119 | A1 | 6/2003 | Mohebbi et al. |
| 2005/0055568 | A1 | 3/2005 | Agrawala et al. |
| 2005/0083199 | A1 | 4/2005 | Hall et al. |
| 2006/0217132 | A1 | 9/2006 | Drummond-Murray et al. |
| 2007/0293232 | A1 | 12/2007 | Nonaka |
| 2007/0296571 | A1 | 12/2007 | Kolen |
| 2008/0119130 | A1 | 5/2008 | Sinha |
| 2008/0240008 | A1 | 10/2008 | Backes et al. |
| 2008/0303655 | A1 | 12/2008 | Johnson |
| 2009/0040952 | A1 | 2/2009 | Cover et al. |
| 2009/0062696 | A1 | 3/2009 | Nathan et al. |
| 2009/0079615 | A1 | 3/2009 | Wu et al. |
| 2009/0128302 | A1 | 5/2009 | Srinivasan et al. |
| 2009/0128360 | A1 | 5/2009 | Bianchi et al. |
| 2010/0013636 | A1 | 1/2010 | Wu |
| 2010/0026490 | A1 | 2/2010 | Butler et al. |
| 2010/0103020 | A1 | 4/2010 | Wu |
| 2010/0130229 | A1 | 5/2010 | Sridhara et al. |
| 2010/0315284 | A1 | 12/2010 | Trinza et al. |
| 2011/0130092 | A1 | 6/2011 | Yun et al. |
| 2011/0148689 | A1* | 6/2011 | Filippi ............ G01S 13/003 342/28 |
| 2012/0009882 | A1 | 1/2012 | Patwari et al. |
| 2012/0011365 | A1 | 1/2012 | Schmidt et al. |
| 2012/0115512 | A1 | 5/2012 | Grainger et al. |
| 2012/0146788 | A1 | 6/2012 | Wilson et al. |
| 2012/0184296 | A1 | 7/2012 | Milosiu |
| 2012/0212366 | A1 | 8/2012 | Alalusi |
| 2013/0005280 | A1 | 1/2013 | Leung et al. |
| 2013/0090151 | A1 | 4/2013 | Ngai et al. |
| 2013/0162459 | A1 | 6/2013 | Aharony et al. |
| 2013/0283256 | A1 | 10/2013 | Proud |
| 2014/0004874 | A1 | 1/2014 | Schwartz et al. |
| 2014/0015706 | A1 | 1/2014 | Ishihara et al. |
| 2014/0128778 | A1 | 5/2014 | Chan et al. |
| 2014/0135042 | A1 | 5/2014 | Buchheim et al. |
| 2014/0140231 | A1 | 5/2014 | Haiut et al. |
| 2014/0247179 | A1* | 9/2014 | Furuskog ............ G01S 13/003 342/28 |
| 2014/0285324 | A1 | 9/2014 | Austin |
| 2014/0286380 | A1 | 9/2014 | Prager et al. |
| 2014/0301260 | A1 | 10/2014 | Park et al. |
| 2015/0042812 | A1* | 2/2015 | Tang ............ H04N 5/23206 348/157 |
| 2015/0043377 | A1 | 2/2015 | Cholas et al. |
| 2015/0063323 | A1 | 3/2015 | Sadek et al. |
| 2015/0078295 | A1 | 3/2015 | Mandyam et al. |
| 2015/0098377 | A1 | 4/2015 | Amini et al. |
| 2015/0189528 | A1 | 7/2015 | Carbajal |
| 2015/0195100 | A1 | 7/2015 | Imes et al. |
| 2015/0212205 | A1 | 7/2015 | Shpater |
| 2015/0245164 | A1 | 8/2015 | Merrill |
| 2015/0247918 | A1* | 9/2015 | Zhang ............ G01C 22/006 702/150 |
| 2015/0292879 | A1 | 10/2015 | Zhou et al. |
| 2015/0338507 | A1 | 11/2015 | Oh et al. |
| 2015/0350849 | A1* | 12/2015 | Huang ............ H04W 4/04 455/456.1 |
| 2015/0350976 | A1 | 12/2015 | Kodali et al. |
| 2016/0018508 | A1 | 1/2016 | Chen et al. |
| 2016/0183059 | A1 | 6/2016 | Nagy et al. |
| 2016/0187475 | A1 | 6/2016 | Horng et al. |
| 2016/0210838 | A1 | 7/2016 | Yan et al. |
| 2016/0241999 | A1 | 8/2016 | Chin et al. |
| 2016/0379074 | A1* | 12/2016 | Nielsen ............ G06K 9/3241 348/143 |
| 2017/0042488 | A1 | 2/2017 | Muhsin |
| 2017/0146656 | A1 | 5/2017 | Belsley et al. |
| 2017/0195893 | A1 | 7/2017 | Lee et al. |
| 2017/0309146 | A1 | 10/2017 | MacKenzie et al. |
| 2017/0343658 | A1 | 11/2017 | Ramirez et al. |
| 2018/0180706 | A1* | 6/2018 | Li ............ H04W 4/029 |

FOREIGN PATENT DOCUMENTS

| | | |
|---|---|---|
| WO | 2014/021574 | 2/2014 |
| WO | 2014/201574 | 12/2014 |
| WO | 2015/168700 | 11/2015 |
| WO | 2016/066822 | 5/2016 |

OTHER PUBLICATIONS

USPTO, Notice of Allowance dated Jan. 10, 2018, in U.S. Appl. No. 15/803,189, 28 pgs.

USPTO; Non-Final Office Action dated Jan. 23, 2018, in U.S. Appl. No. 15/789,815, 35 pgs.

Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.

Zheng, et al., "Detecting Radio Frequency Interference for CSI Measurements on COTS WiFi Devices", IEEE ICC 2017, Ad-Hoc and Sensor Networking Symposium, May 2017, 6 pgs.

USPTO, Notice of Allowance dated Jan. 29, 2018, in U.S. Appl. No. 15/461,125, 16 pgs.

USPTO, Notice of Allowance dated Feb. 13, 2018, in U.S. Appl. No. 15/683,637, 25 pgs.

USPTO, Non-Final Office Action dated Feb. 7, 2018, in U.S. Appl. No. 15/176,489, 30 pgs.

USPTO, Non-Final Office Action dated Jan. 26, 2018, in U.S. Appl. No. 15/815,199, 36 pgs.

CIPO, International Search Report and Written Opinion dated Jan. 26, 2018, in PCT/CA2017/051290, 9 pgs.

USPTO, Notice of Allowance dated May 2, 2018, in U.S. Appl. No. 15/691,195, 21 pgs.

USPTO, Notice of Allowance dated May 1, 2018, in U.S. Appl. No. 15/799,768, 27 pgs.

USPTO, Non-Final Office Action dated Mar. 14, 2018, in U.S. Appl. No. 15/706,295, 39 pgs.

USPTO, Notice of Allowance dated Mar. 8, 2018, in U.S. Appl. No. 15/706,193, 40 pgs.

USPTO, Non-Final Office Action dated Mar. 9, 2018, in U.S. Appl. No. 15/836,606, 49 pgs.

(56) References Cited

OTHER PUBLICATIONS

CIPO, International Search Report and Written Opinion dated Feb. 9, 2018, in PCT/CA2017/051276, 9 pgs.
WIPO, International Search Report and Written Opinion dated Apr. 25, 2018, in PCT/CA2018/050046, 9 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Hyder, et al., "Acoustic Scene Classification using a CNN-SuperVector system trained with Auditory and Spectrogram Image Features", Interspeech 2017, Stockholm Sweden, Aug. 20-24, 2017, 5 pgs.
Li, et al., "A Convolutional Neural Network Cascade for Face Detection", IEEE, 2015, 10 pgs.
Tsironi, et al., "Gesture Recognition with a Convolutional Long Short-Term Memory Recurrent Neural Network", European Symposium on Artificial Neural Networks, Computational Intelligence and Machine Learning, Bruges (Belgium), Apr. 27-29, 2016, 6 pgs.
Zheng, et al., "Time Series Classification Using Multi-Channels Deep Convolutional Neural Networks", 2014, 13 pgs.
USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.
USPTO, Non-Final Office Action issued in U.S. Appl. No. 15/691,195 dated Nov. 15, 2017; 17 pgs.
Canadian Intellectual Property Office, International Search Report and Written Opinion for International Application No. PCT/CA2017/050037 dated Apr. 13, 2017, 12 pages.
USPTO, Notice of Allowance issued in U.S. Appl. No. 15/461,125 dated Aug. 30, 2017, 15 pages.
Canadian Intellectual Property Office, International Search Report and Written Opinion issued International Application No. PCT/CA2016/051228 dated Apr. 25, 2017, 8 pages.
Canadian Intellectual Property Office, International Search Report and Written Opinion issued in International Application No. PCT/CA2016/051466 dated Mar. 14, 2017, 9 pages.
Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.
CEVA; "CEVA's DSP Cores Power the World's Leading Mobile Broadband and M2M Applications"; http://www.ceva-dsp.com/Mobile-Broadband; 3 pages; May 15, 2016.
Japan Radio Co., Ltd; "26GHz FWA—Technology"; http://www.jrc.co.jp/eng/product/lneup/26ghz_wireless_ip_access_system/tech.html; 3 pages; May 15, 2016.
Non-Final Office Action received in U.S. Appl. No. 15/099,833, dated Jun. 27, 2016, 16 pages.
Non-Final Office Action received in U.S. Appl. No. 15/151,571, dated Aug. 5, 2016, 18 pages.
Notice of Allowance received in U.S. Appl. No. 15/099,833, dated Oct. 14, 2016, 8 pages.
Notice of Allowance received in U.S. Appl. No. 15/151,571, dated Jan. 10, 2017, 9 pages.
Notice of Allowance received in U.S. Appl. No. 15/228,418, dated Oct. 12, 2016, 9 pages.
Quora.com; "What is the function of the baseband processor in wireless devices?"; https://ww.quora.com/What-is-the-function-of-the-baesband-processor-in-wireless-devices; 2 pages; May 15, 2016.
Wikipedia; "Baseband processor"; rhttps://en.wikipedia.org/wiki/Bandband_processor; 2 pages; version dated Apr. 20, 2016.
Canadian Intellectual Property Office, International Search Report and Written Opinion, in International Application No. PCT/CA2016/051229, dated Jan. 17, 2017, 9 pages.
Netgear, "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.
Openwrt, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Final Office Action received in U.S. Appl. No. 15/176,489 dated Jun. 23, 2017, 23 pages.
USPTO, Notice of Allowance issued in U.S. Appl. No. 15/460,643 dated Jun. 12, 2017, 34 pages.
USPTO, Non-final Office Action issued in U.S. Appl. No. 15/461,125 dated Apr. 19, 2017, 56 pages.
USPTO, "Non-final Office Action", issued in U.S. Appl. No. 15/176,489 dated Mar. 22, 2017, 41 pages.
WIPO, International Search Report and Written Opinion dated Jul. 12, 2018, in PCT/CA2018/050079, 8 pgs.

\* cited by examiner

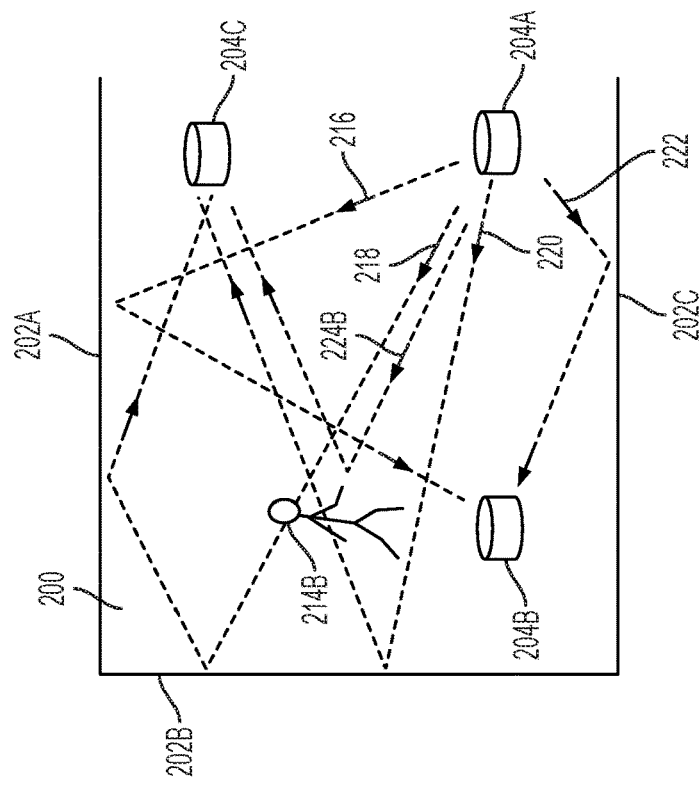
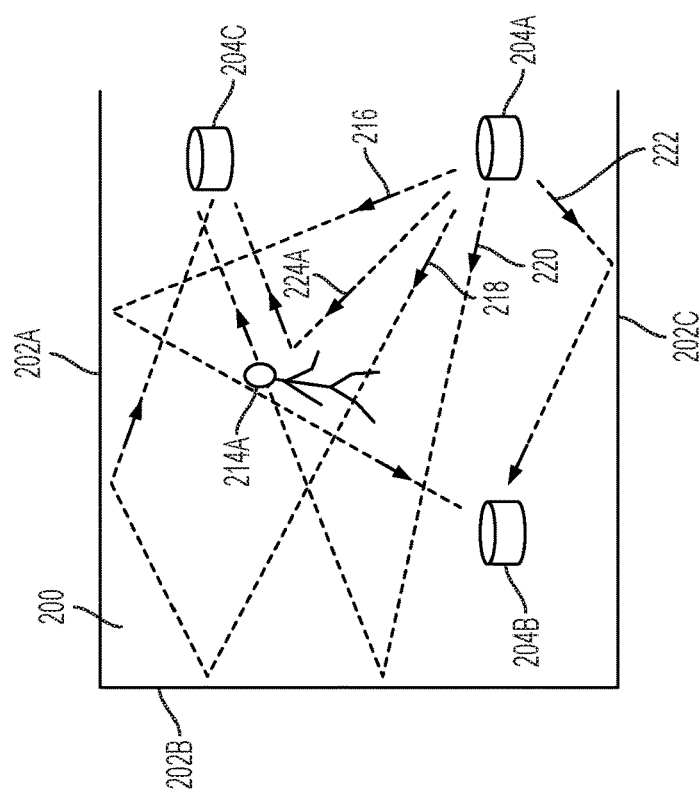
FIG. 2A
FIG. 2B

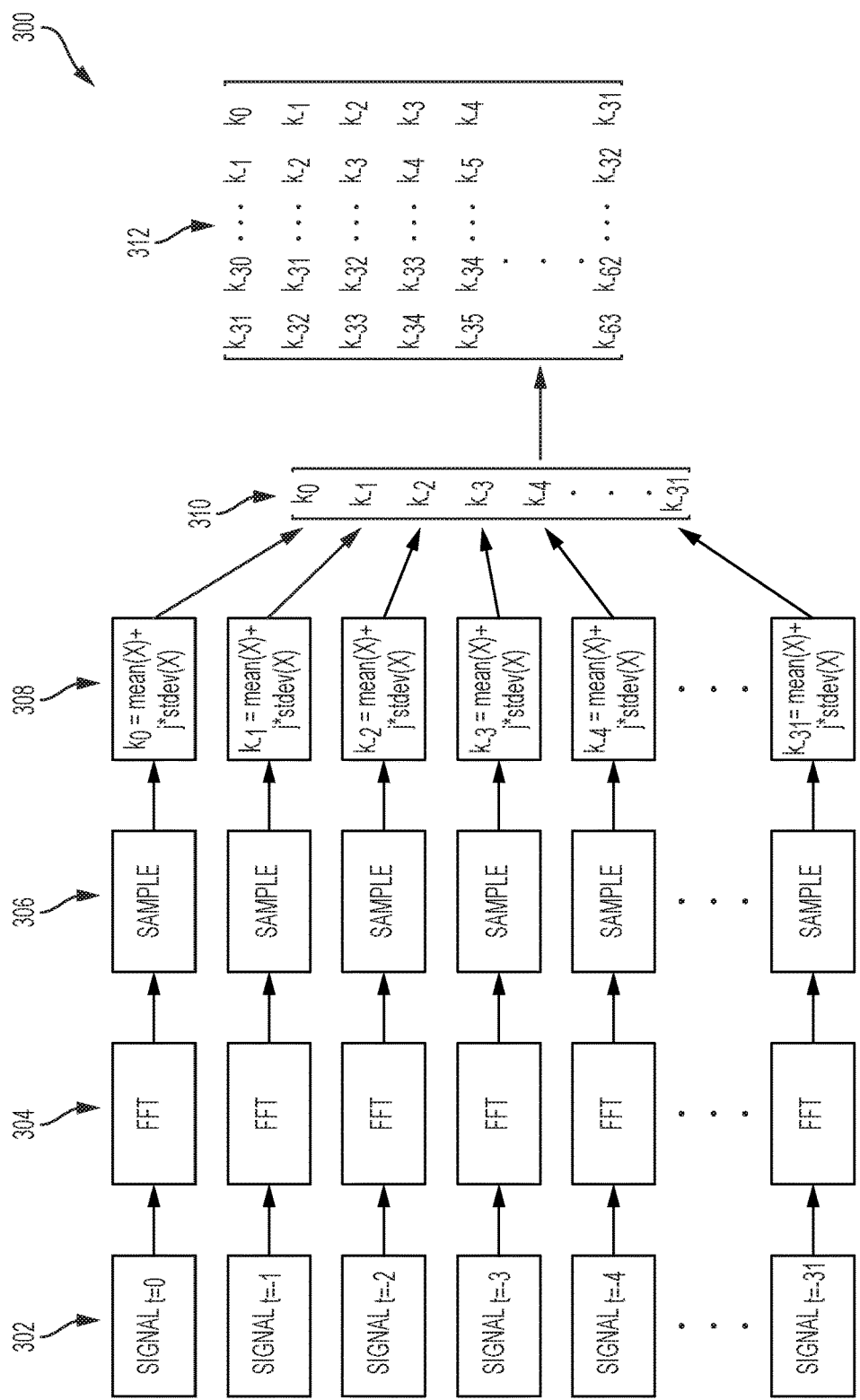

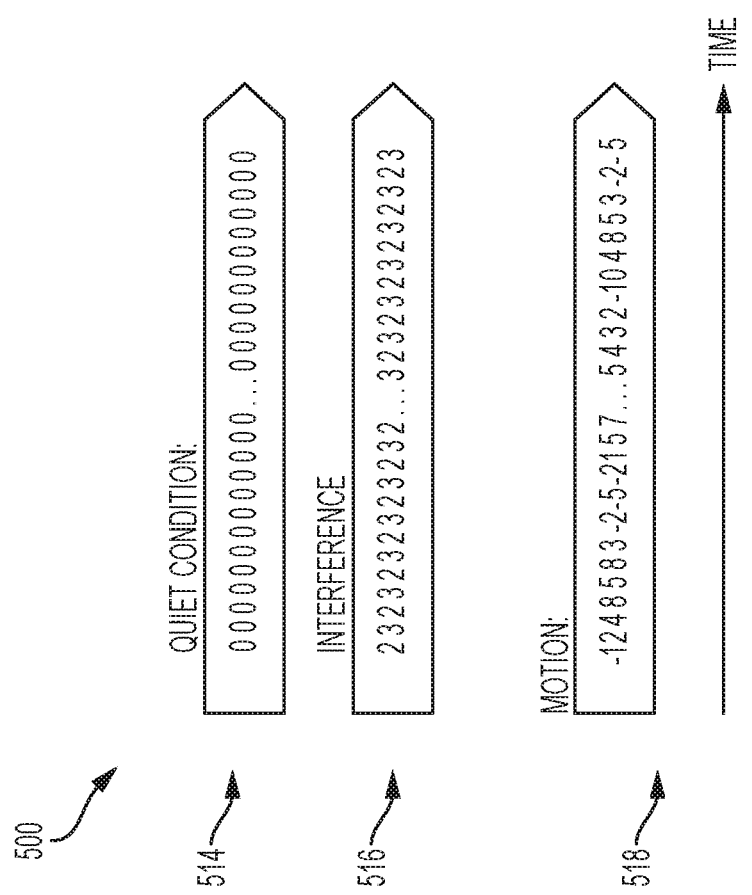

MOTION DETECTION BASED ON FILTERED STATISTICAL PARAMETERS OF WIRELESS SIGNALS

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 2A and 2B are diagrams showing example wireless signals communicated between wireless communication devices.

FIG. 3 is a diagram showing an example process of generating a matrix of statistical parameters based on signals received at a wireless communication device.

FIGS. 5A-5C are diagrams showing an example process of detecting and categorizing channel perturbations in a space based on the histogram data of FIG. 4.

DETAILED DESCRIPTION

In some aspects of what is described, motion of an object is detected based on statistical parameters of wireless signals. The wireless signals may be received at a first wireless communication and may be based on motion probe signals transmitted through a space between wireless communication devices. The statistical parameters may be computed for each received wireless signal based on the frequency components of the received wireless signal (or a subset thereof). For example, the statistical parameters may include a mean and standard deviation of the frequency components of a frequency-domain representation of the received wireless signals, in some instances.

Groupings of the statistical parameter values may be identified, and a motion detection process may use the identified groupings of statistical parameter values to detect whether motion of an object has occurred. For example, histogram data representing a distribution of statistical parameter values may be generated and analyzed to determine whether a channel perturbation in a space is caused by motion of an object or interference. The histogram data may be in matrix form, in some instances. In some implementations, the motion detection process performs one or more operations on the histogram data matrix to compute check values, which are compared with respective thresholds to determine whether a channel perturbation has occurred. Motion signature values may be determined based on the computed check values, and the motion signature values may be analyzed (e.g., patterns in the values identified) to determine whether the channel perturbation is caused by motion of an object or interference signals. In some implementations, the values of the statistical parameters may be filtered before being used in the motion detection process. The filtering process may include a singular value decomposition performed on an initial matrix of statistical parameter values, a scaling based on signal quality metric values, time factor values, or a combination thereof.

The systems and techniques described here may provide one or more advantages in some instances. For example, motion may be detected using wireless signals transmitted through a space between wireless communication devices, without the need for line-of-sight between the devices. Motion, and different categories of motion, may be detected more efficiently by analyzing statistical parameters of the wireless signals. For example, channel perturbations caused by motion of living objects (e.g., a person or animal) may be distinguished from interference signals or motion by inanimate objects (e.g., electrical fans).

Figure 1:
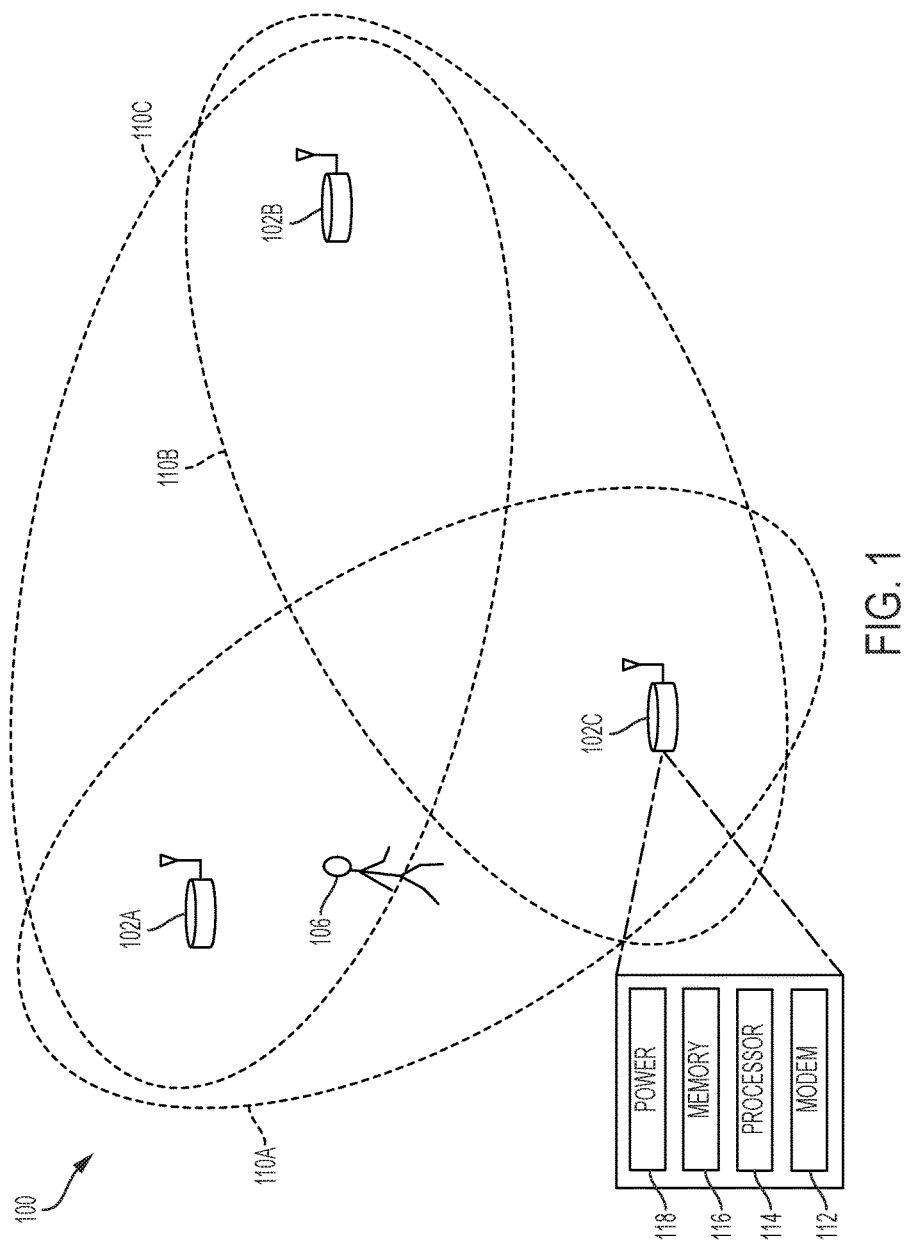
FIG. 1 is a diagram showing an example wireless communication system.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for determining a location of detected motion, such as through one or more of the operations of the example process 600 of FIG. 6.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-9, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.). The second and third wireless communication devices 204B, 204C are operable to receive signals based on the motion probe signals transmitted by the wireless communication device 204A. The wireless communication devices 204B, 204C each have a modem, processor, or other component that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omni-directional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} \left(\alpha_{n,k} e^{j\phi_{n,k}}\right) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. In some implementations, the complex value $H_n$ represents a frequency component of a frequency response signal H that is based on the received signal R. When an object moves in the space, the complex value $H_n$ changes due to the channel response $\alpha_{n,k}$ of the space changing. Accordingly, a change detected in the channel response (and thus, the frequency response signal H) can be indicative of movement of an object within the communication channel. In some instances, noise, interference or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k) h_{ch}(k) \tag{7}$$

with the optimization criterion $$\min_{h_{ch}} \sum \left(\hat{R}_{cvd} - R_{cvd}\right)^2. \tag{8}$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, the signal quality metric is based on (e.g., is set equal to, is computed from, is representative of, etc.) a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \tag{9}$$

The signal quality metric may be determined using other calculations. In some cases, for example, the absolute value or magnitude of the dot product or another computed value is used as a signal quality metric for the received signal. In some cases, the signal quality metric is a correlation index, or another type of signal quality metric. In some cases, the signal quality metric is determined based on a signal-to-noise ratio (SNR) of the received signals.

In some cases, received signals may be "rejected" by a wireless communication device. For example, in some implementations, a motion detection process may include quality criterion for signals used in the motion detection process. Signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, a motion detection process uses only a subset of received signals that have values Q above a certain threshold.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function) may occur on the received baseband signal, and the baseband signal may be the signal that is processed (e.g., using a Fourier analysis or another type of analysis) to detect movement. In other examples, the processed signal may be an RF signal or another signal.

In some implementations, statistical parameters may be determined for received wireless signals. The statistical parameters may describe a characteristic of the signals, and may be based on a function applied to frequency components of a frequency domain representation of the received wireless signals. In some instances, the statistical parameter includes one or more of at least one of the maximum, minimum, mean, or standard deviation of one or more frequency components of the received signals. For instance, in some implementations, a frequency response signal H based on the received signal R at a wireless communication device is represented by the vector $$\vec{H}_j = (h_{1,j}, h_{2,j}, h_{3,j}, \ldots, h_{n,j}). \tag{10}$$

The elements of the vector $\vec{H}_j$ are frequency components for respective frequency values $\omega_1, \omega_2, \omega_3, \ldots, \omega_n$ at a time point j. The frequency components $h_{i,j}$ may be complex values, in some cases. Functions can be defined and applied to the frequency response signal H or to certain frequency components $h_{i,j}$ of the frequency response signal to yield statistical parameters that describe characteristics of the frequency response signal. The statistical parameter can be computed, for example, based on a statistical function or other type of mathematical function that indicates a characteristic of the frequency response signal. A function can then be applied to the vector $\vec{H}_j$ (or elements thereof) to yield values of one or more statistical parameters for the respective time segments. For example, the statistical parameter may be based on a function that determines a mean, such as, for example, according to the mean value function $$\text{mean}_j = \frac{\sum_{i=1}^{n} |h_{i,j}|}{N} \tag{11}$$

where N is the number of frequency components or elements of $\vec{H}_j$. As another example, the statistical parameter may be based on a function that determines a standard deviation, such as, for example, according to the standard deviation function:

$$std_j = \sqrt{\frac{\sum_{i=1}^{n} (|h_{i,j}| - \text{mean})^2}{N-1}} \tag{12}$$

where N is the number of frequency components or elements of $\vec{H}_j$.

In some cases, motion, distinct categories of motion, or a location of detected motion can be detected based on the statistical parameter values. For example, groupings of the statistical parameter values may be identified and analyzed as described below to detect whether a channel perturbation has occurred in a space, what type of channel perturbation has occurred (e.g., interference versus motion of an object), and a location of the channel perturbation in the space (e.g., relative to a wireless communication device). In some instances, machine learning may be used to identify patterns in or groupings of the statistical parameter values. For example, statistical parameter values may be passed through a neural network (e.g., the GOOGLE CLOUD ML platform) to learn distinct patterns in the statistical parameter values or other values based on the statistical parameter values (e.g., check values or motion signature values as described further below).

FIG. 3 is a diagram showing an example process 300 of generating a matrix 312 of statistical parameters based on wireless signals 302 received at a wireless communication device. In the example shown, the signals 302 are received over a time period t={0, 31} by a wireless communication device in a wireless communication system (e.g., the wireless communication device 102C of FIG. 1 or the wireless communication devices 204B, 204C of FIG. 2). The signals 302 may be an analog representation of the wireless signals received at the wireless communication device. For example, the signals 302 may include an output of the radio subsystem of the wireless communication device. In some implementations, the signals 302 analyzed in the process 300 may only include those signals that have been accepted as inputs to the process. For instance, the signals 302 may be compared with one or more quality criteria (e.g., a signal quality metric threshold) to determine whether to further process the signals 302.

In the example shown, the signals 302 are transformed into a frequency domain representation by operation of a fast Fourier transform (FFT) operation 304, which produces an output that includes frequency components of the signals 302. For example, in some cases, the signals 302 may have a bandwidth of approximately 22 MHz, and the FFT operation may use a bandwidth of 88 MHz (based on an oversampling rate of 4) to produce 64 frequency components of the signals 302. The output of the FFT operation 304 is then sampled by a sampling operation 306. In some implementations, the sampling operation selects a subset of the frequency components output by the FFT operation 304. For instance, using the example above where the FFT operation 304 outputs 64 frequency components, the sampling operation 306 may select eight (8) frequency components that are centered around ω=0 (four (4) frequency components with ω<0, and four (4) frequency components with ω>0).

Statistical parameter values are then determined based on frequency components of the signals 302. For instance, in the example shown, mean and standard deviation values of the sampled frequency components of the signal 302 at time t are computed, and a complex value 308 ($k$) is generated based on the mean and standard deviation. The mean and standard deviation may be computed based on the magnitudes of the respective sampled frequency components. For instance, referring to the example above, the mean may be computed by determining the average of the sampled frequency component magnitudes at time t and the standard deviation may be computed by determining a variance of the sampled frequency component magnitudes around the mean at time t. In some cases, such as the example shown in FIG. 3, the real component of the complex value 308 includes the computed mean value and the imaginary component of the complex value 308 includes the computed standard deviation value.

Arrays are generated based on the complex values determined for consecutively-processed signals. For instance, in the example shown, the array 310 includes the 32 complex values 308 determined for times t={0, 31}. Other arrays are also generated based on the latest set of complex values, where the complex values are processed in a first-in/first-out fashion. For example, a second array would include the 32 complex values determined for times t={1, 32}, a third array would include the 32 complex values determined for times t={2, 33}, and so forth until an array is determined for the 32 complex values 308 determined for times t={31, 63}. The matrix 312 is then generated based on the arrays 310. For instance, in the example shown the matrix 312 is generated by making the first array for times t={0, 31} the right-most column, the second array for times t={1, 32} into the second column from the right, and so forth until the left-most column is the array for times t={31, 63} as shown in FIG. 3. The matrix 312 may be considered to be an auto correlation matrix or a Toeplitz matrix, in some instances. The matrix 312 may be formatted in another manner.

Figure 4:
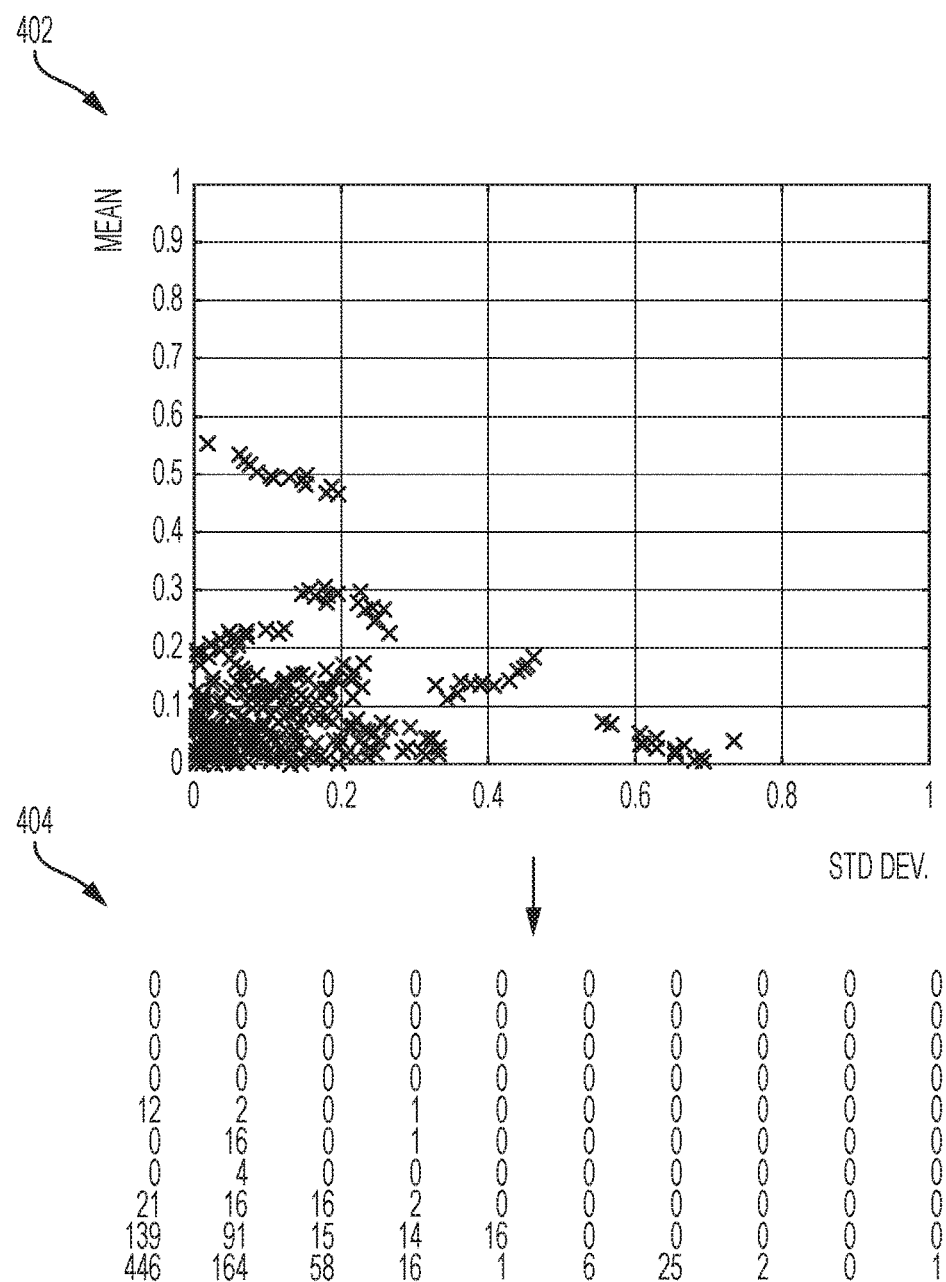
FIG. 4 is a diagram showing an example plot and example histogram data based on the matrix generated in FIG. 3.

FIG. 4 is a diagram showing an example plot 402 and example histogram data 404 based on the matrix 312 generated in FIG. 3. Each data point of the example plot 402 represents an element in the matrix 312. In particular, each data point of the example plot 402 represents values for the standard deviation according to Equation (12) on the horizontal axis and the mean according to Equation (11) on the vertical axis. Thus, the horizontal axis represents the imaginary portion of the complex values k in the matrix 312, and the vertical axis represents the real portion of the complex values k in the matrix 312. In the example plot 402, each data point value is normalized to values between zero (0) and one (1) based the equation:

$$\text{Normalized}(x_i) = \frac{x_i - \min(X)}{\max(X) - \min(X)} \quad (13)$$

where $x_i$ represents a particular value in the set of values $X = (x_1, x_2, x_3 \ldots x_n)$ for i=1 to n.

The histogram data 404 may be generated based on a binning of the statistical parameter values in the matrix 312. For instance, the histogram data 404 may include a set of bins based on the range of statistical parameter values (e.g., a first bin for the range 0-0.1, a second bin for the range 0.1-0.2, etc.) and a quantity of data points that fall within the respective range for each bin. In some instances, such as the example shown in FIG. 4, the histogram data 404 may be represented in matrix form. For instance, the example histogram data 404 is a 10×10 matrix whose elements represent a quantity of data points falling within the respective bins defined by 0.1 increments of the statistical parameter values. As an example, the lower left element of the histogram data 404 indicates that there are 446 data points whose mean and standard deviation values are between 0 and 0.1. The histogram data 404 may be generated in another manner. In some implementations, the histogram data 404 is used to detect channel perturbations in a space, such as, for example, as described further below.

Figure 5A:
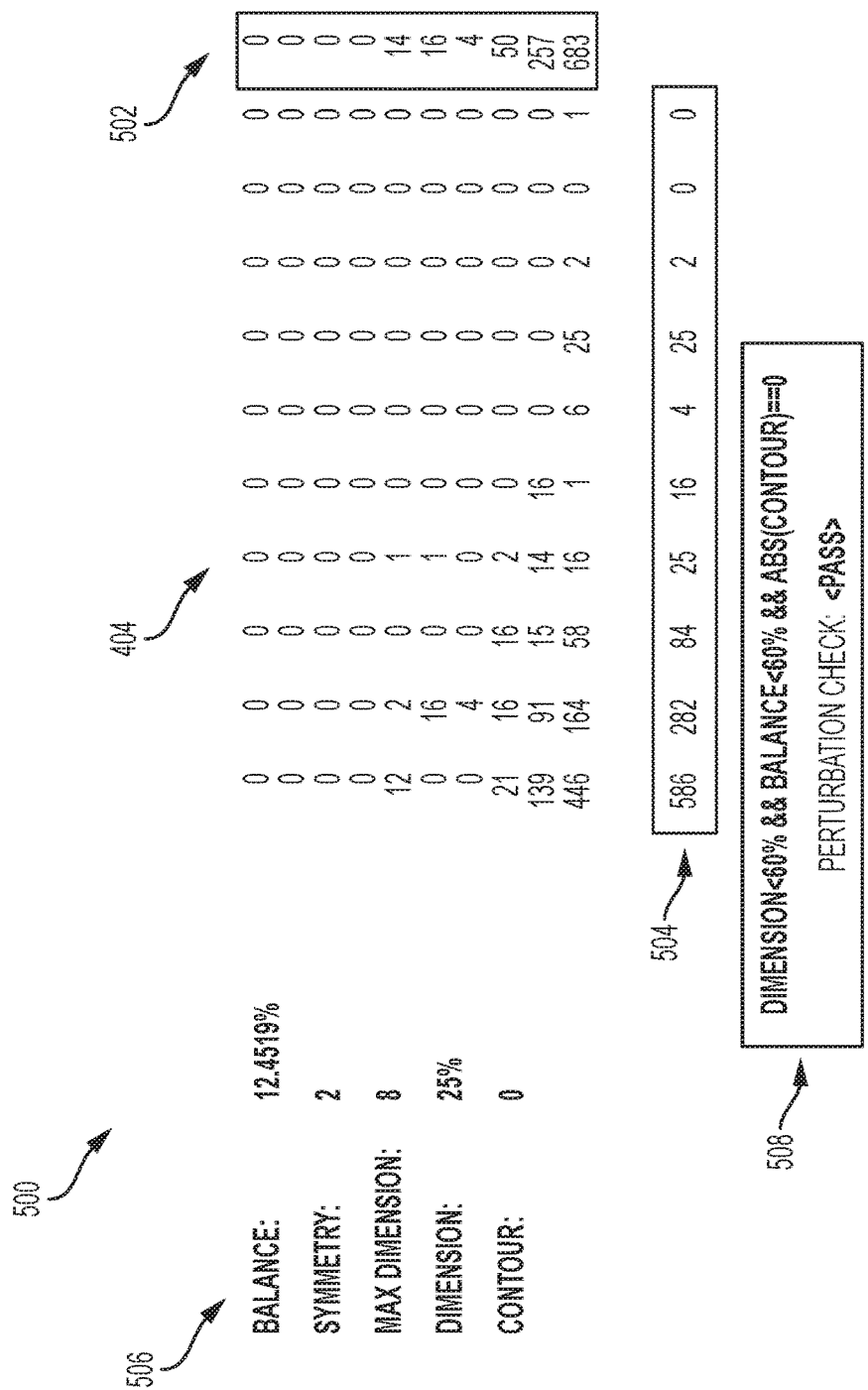
Figure 5B:
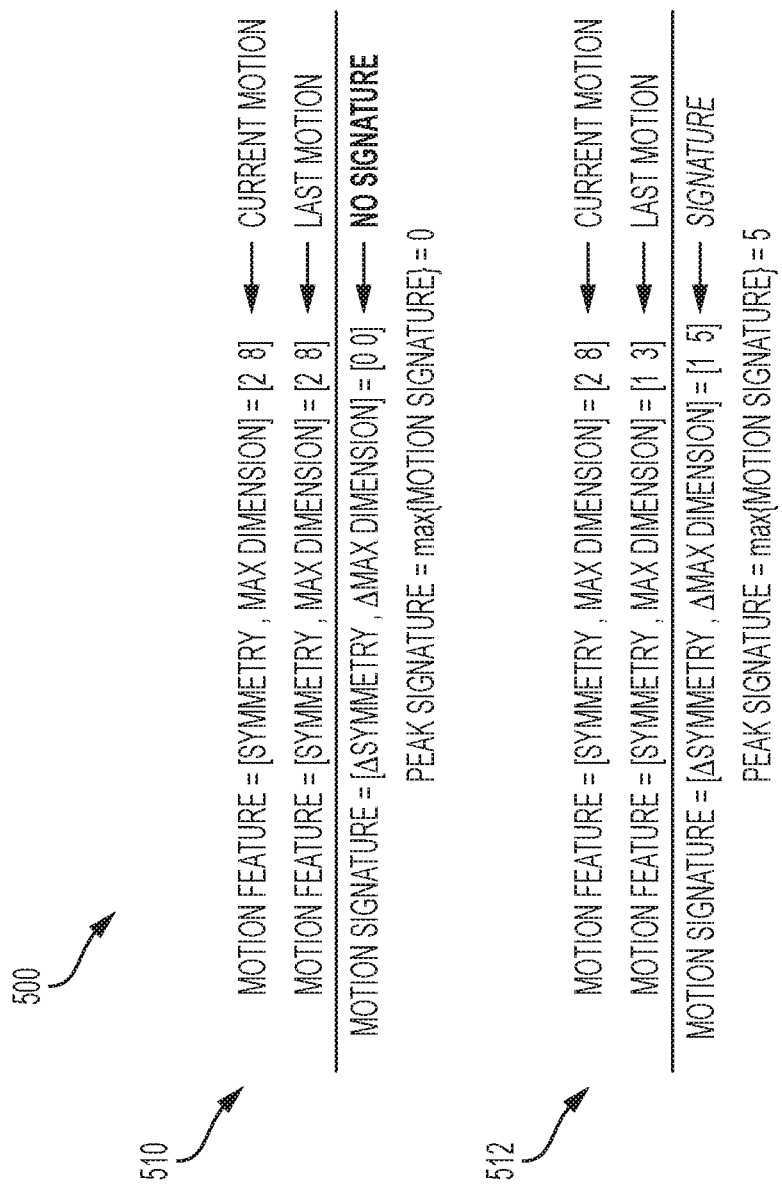

FIGS. 5A-5C are diagrams showing an example process 500 of detecting and categorizing channel perturbations in a space based on the histogram data 404 of FIG. 4. In the example shown, a row sum operator and a column sum operator are applied to the histogram data 404 to produce the arrays 502 and 504, respectively. The row sum operator determines the sum of the elements in each respective row of the histogram data matrix, and the column sum operator determines the sum of the elements in each respective column of the histogram data matrix. The row sum operator may be applied by multiplying the histogram data matrix by a vertical array whose elements are all equal to one. The vertical array may have a length N (e.g., a matrix of dimension N×1) where the histogram data matrix has dimension N×N. The column sum operator may be applied by multiplying the histogram data matrix by a horizontal array whose elements are all equal to one. The horizontal array may have a length N (e.g., a matrix of dimension 1×N) where the histogram data matrix has dimension N×N.

The arrays 502, 504 may then be used to determine one or more check values 506 for detecting whether motion has occurred. In the example shown, the check values include a balance value, a symmetry value, a max dimension value, a dimension value, and a contour value. In the example shown, the balance value is determined by the equation $$\text{Balance} = \frac{\sum CO(2 \to N) - \sum RO(2 \to N)}{\sum CO(2 \to N) + \sum RO(2 \to N)} \quad (14)$$

where CO represents the array output by the column operator and RO represents the array output by the row operator. In the example shown, the symmetry value is determined by subtracting the number of non-zero elements in the array output by the row operator from the number of non-zero elements in the array output by the column operator, which can be represented by the equation $$\text{Symmetry} = (\#\text{non-zero}(CO)) - (\#\text{non-zero}(RO)) \quad (15)$$

In the example shown, the max dimension value is the maximum between the number of non-zero elements in the array output by the row operator and the number of non-zero elements in the array output by the column operator, which can be represented by the equation $$\text{Max Dimension} = \max[(\#\text{non-zero}(CO)),(\#\text{non-zero}(RO))] \quad (16)$$

In the example shown, the dimension value is the result of dividing the symmetry value by the max dimension value, which can be represented by the equation $$\text{Dimension} = \frac{\text{Symmertry}}{\text{Max Dimension}} \quad (17)$$

In the example shown, the contour value is determined based on derivative operators applied to the arrays output by the row and column operators. The derivative operator may be represented by the equation $$\text{Derivative}(n) = X(n+1) - X(n) \quad (18)$$

where X represents the array output by either the row or column operators. The derivative operator may accordingly provide an output array that has a length (N−1) where the output array of the row and column operators have lengths of N. In the example shown, the result of the derivative operator applied to the array output by the row operator is

[−426, −207, −46, 12, −2, −14, 0, 0, 0]

and the result of the derivative operator applied to the array output by the column operator is

[−304, −198, −59, −9, −12, 21, −23, −2, 0].

The contour value is then determined as the number of elements that exceed a contour threshold. In the example shown, the contour threshold is 22, which results in a contour of zero (0) because none of the elements in the above arrays are greater than 22. The check values may be determined in another manner than described above. For instance, additional or fewer check values may be determined, or the check values described above can be determined using different operations or equations.

The check values 506 can then be analyzed to determine whether a perturbation in the channel has occurred. For instance, in the example shown, the dimension value is compared with a threshold value of 60%, the balance value is compared with a threshold value of 60%, and the contour is checked to ensure that it equals zero (0). Because the dimension value in the example shown is less than the threshold value of 60%, the balance value is less than the threshold value of 60%, and the contour is equal to zero, it is determined that a perturbation has occurred in the channel (which can indicate motion in the space accessed by the wireless signals or interference). In some implementations, the check values 506 may be analyzed over time to identify patterns and categorize types of channel perturbations. For instance, as described below, certain check values may be used to determine motion signature values, and the motion signature values may be analyzed over time to detect whether a channel perturbation is motion of an object versus interference in the space.

FIG. 5B shows example motion signature value determinations 510, 512 based on certain of the check values 506 of FIG. 5A. In the examples shown, the symmetry and max dimension check values are shown for two different times, and are referred to as motion features. Motion signature values are determined based on the differences between the respective check values at the different times, and a peak signature value is determined as the maximum of the two motion signature values. In the example determination 510, the check values do not change between the two different times, and thus have motion signature values of zero (0) and a peak signature value of zero (0). The perturbation associated with the determination 510 may be said to have no signature because the peak signature value is zero (0). On the other hand, in the example determination 512, the check values change between the two different times, and produce motion signature values of one (1) and five (5) and a peak signature value of five (5) as shown. The perturbation associated with the determination 512 may be said to have a signature because the peak signature value is non-zero. The motion signature values and peak signature value may be determined in another manner. For instance, the motion signature values may be based on additional or fewer check values.

FIG. 5C shows example peak signature values for different channel perturbation scenarios 514, 516, 518. The peak signature values shown are a series of peak signature values determined at different points in time. By analyzing the series of peak signature values, it can be determined whether a perturbation in a channel is caused by interference or motion of an object. For instance, in the example scenario 514, the peak signature values consist of repeating zeroes, which indicates a "quiet condition" where no motion or other channel perturbation is occurring in the space accessed by the wireless signals. In the example scenario 516, the peak signature values alternate between two (2) and three (3), which indicates interference signals in the space accessed by the wireless signals. In the example scenario 518, the peak signature values vary randomly over time, which indicates motion by an object in the space accessed by the wireless signals. In some cases, motion signature patterns for different categories of motion may be based on a standard deviation of the motion signature values. For example, a standard deviation of values may be determined for a set of motion signature values, and the standard deviation value may be compared with a threshold value to determine whether the motion signature values have a widely varying pattern (which may indicate motion) or have a pattern with little to no variation (which may indicate interference or no motion). In some instances, motion signature value patterns for different categories of channel perturbations may be learned through machine learning. For example, known patterns associated with interference, motion, or other types of channel perturbations can be learned by a neural network, and the neural network can then be used to analyze future patterns to identify types of channel perturbations.

Figure 6:
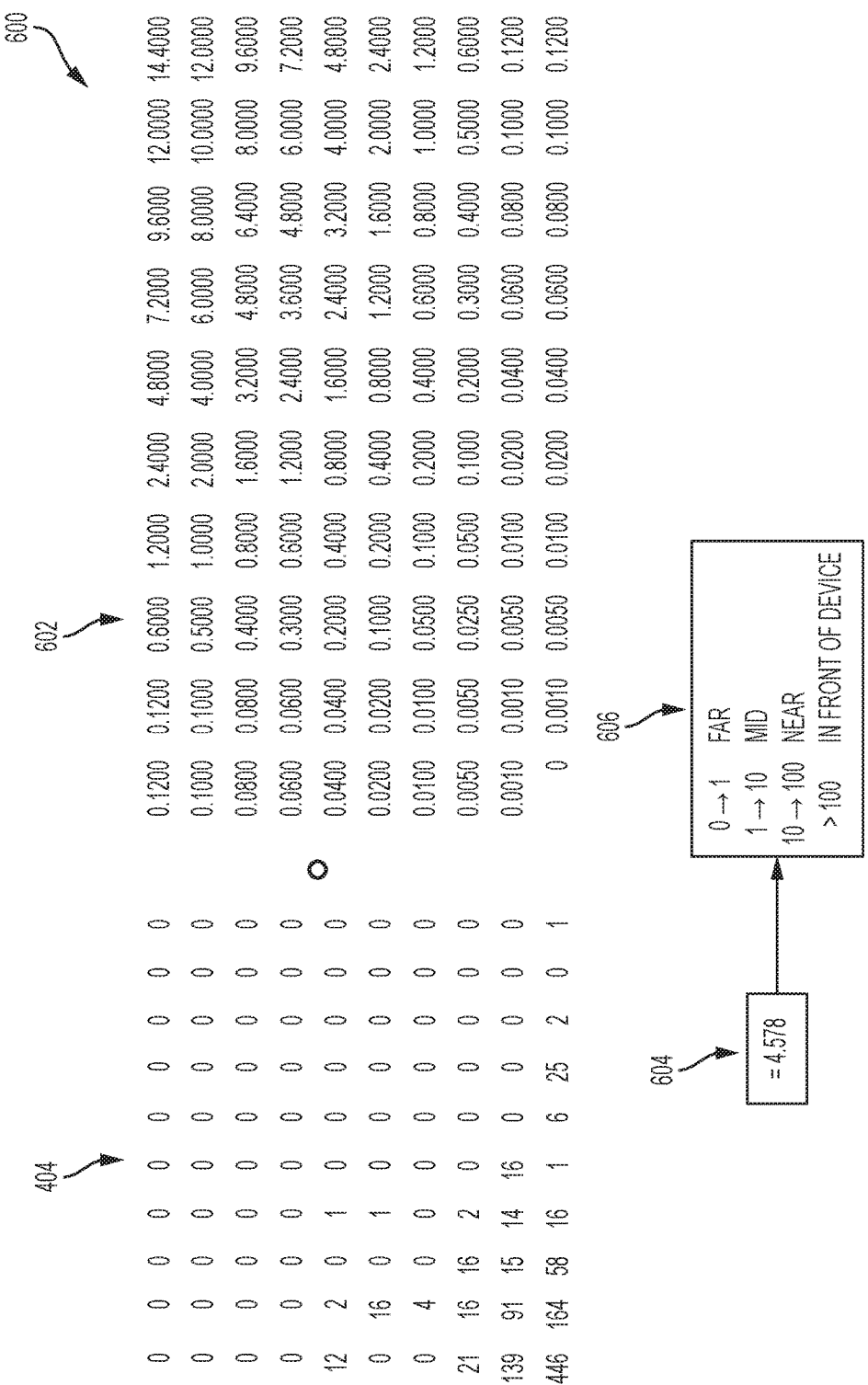
FIG. 6 is a diagram showing an example process of computing a range estimation value based on the histogram data of FIG. 4.

FIG. 6 is a diagram showing an example process 600 of computing a range estimation value 604 based on the histogram data 404 of FIG. 4. In some instances, the histogram data 404 is represented in a matrix of dimension N×N (a square matrix). For instance, in the example shown, the histogram data matrix 404 has a dimension of 10×10. In some implementations, the range estimation value 604 may be based on a matrix dot product of the histogram data matrix 404 and a range scaling matrix 602. The elements of the range scaling matrix 602 may include range scaling values that weight the respective elements of the histogram data matrix in the computation of the range estimation value. In some implementations, the respective range scaling values of the range scaling matrix are determined by creating an initial set of range scaling values and using logistic regression to arrive at final range scaling values (that more accurately represent a range determination).

In some instances, histogram data in bins further away from the origin and axes may indicate intense channel perturbations, and thus motion close by to the receiving device. Thus, in some implementations, the range scaling values of the range scaling matrix 602 may be relatively lower for histogram data near the origin (the lower left of the matrix 602) or the axes, and relatively higher for histogram data far away from the origin and axes. For instance, in the example shown, the range scaling value for the bin closest to the origin (lowest left element of the matrix 602) is zero (0) while the range scaling value for the bin furthest away from the origin (upper right element of the matrix 602) is 14.400.

In some implementations, the range estimation value 604 may be compared to one or more thresholds to determine a location of detected motion in a space relative to the device receiving the signals upon which the motion detection was based. For instance, in the example shown, the matrix dot product of the histogram data 404 and the range scaling matrix 602 produces a range estimation value 604 of 4.578. In this example, the range estimation value 604 is compared with the thresholds 606 to determine that the detected motion (or channel perturbation) is in a "mid" range from the receiving device.

Figure 7:
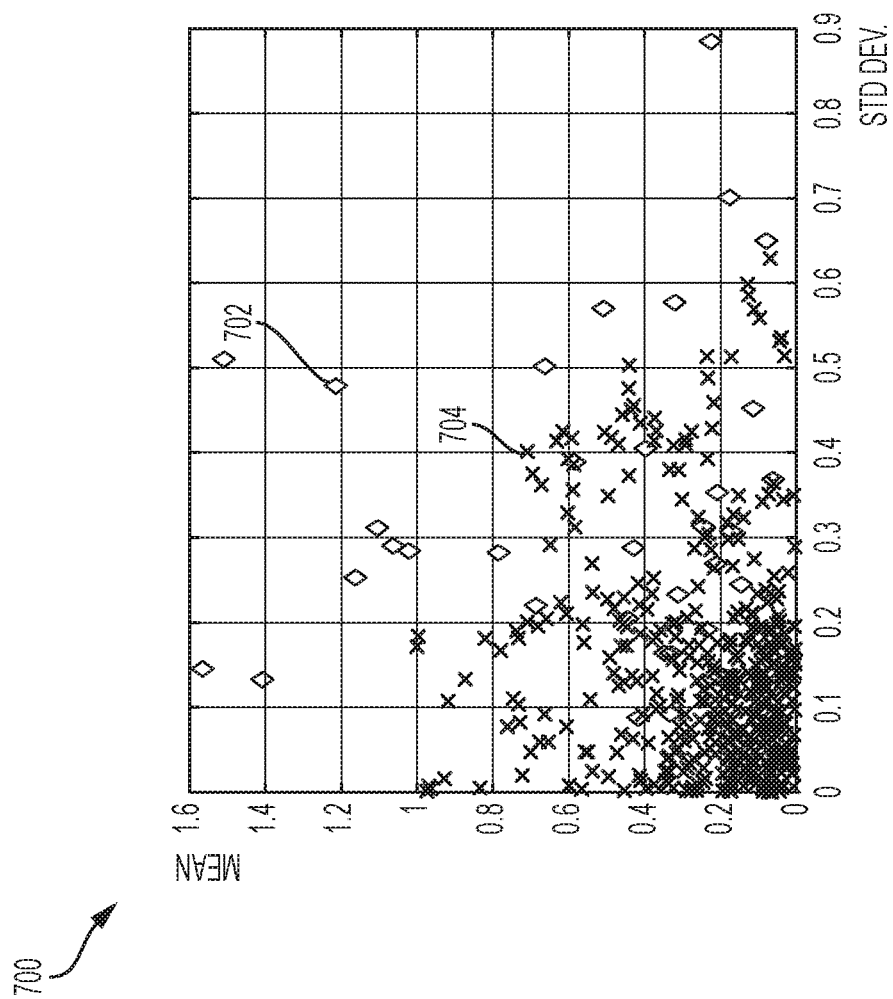
FIG. 7 is a diagram showing an example plot based on unfiltered and filtered values of the matrix generated in FIG. 3.

In some implementations, the statistical parameter values may be filtered prior to being analyzed as described above. FIG. 7 is a diagram showing an example plot 700 based on unfiltered and filtered values of the matrix 312 generated in FIG. 3. The data points of the example plot 700 each represent an element of the matrix 312, and each data point represents values for the standard deviation according to Equation (12) on the horizontal axis and the mean according to Equation (11) on the vertical axis. In the example plot 700, the data points 702 (marked with diamond shapes) represent the statistical parameters of the matrix 312 without any filtering applied, while the data points 704 (marked with x shapes) represent the statistical parameters of the matrix 312 after a filter has been applied.

In the example shown in FIG. 7, for instance, the data points 704 represent filtered values of the matrix 312 after a singular value decomposition (SVD) operation has been applied to the matrix 312 generated as described above with respect to FIG. 3. The SVD operation can be used to decompose the matrix 312 into separate matrix components according to the equation $$K = U \times \Sigma \times V^T \quad (19)$$

where K represents the matrix 312, U represents a rotational matrix, $\Sigma$ represents a singular value matrix (e.g., a diagonal matrix with real values), and V represents a reflection matrix. In some instances, the SVD operation includes zeroing out the first three (3) singular values in the matrix $\Sigma$ to yield a matrix $\Sigma^*$, and reconstruction the matrix K to form a filtered matrix K* according to the equation $$K^* = U \times E^* \times V^T. \quad (20)$$

The SVD operation may have the effect of zeroing out the first three (3) values of the left and right matrices (U and V, respectively), which may filter out outlier or other undesired data from the matrix 312.

Figure 8A:
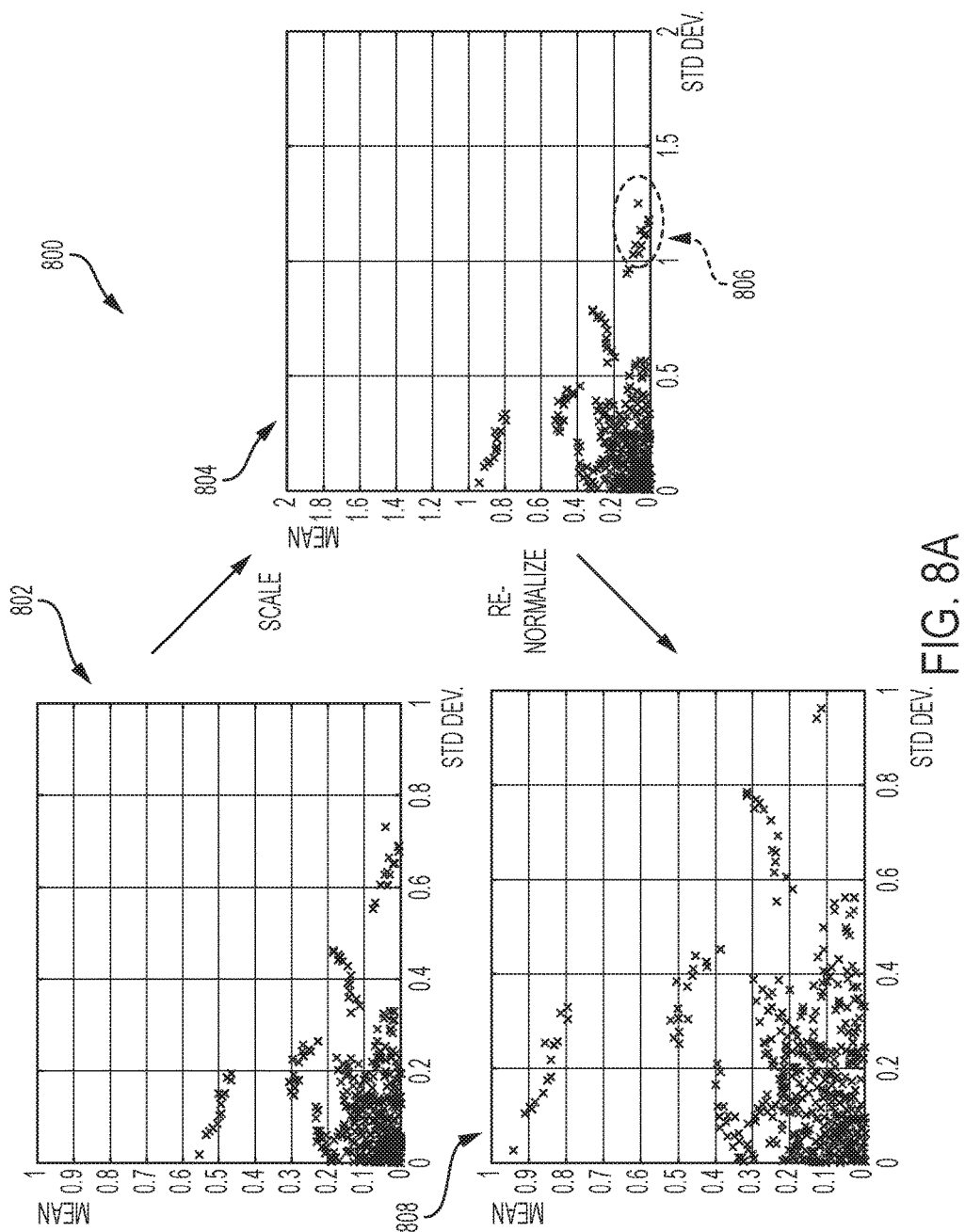
FIGS. 8A-8B are diagrams showing an example process of scaling and renormalizing statistical parameters.
Figure 8B:
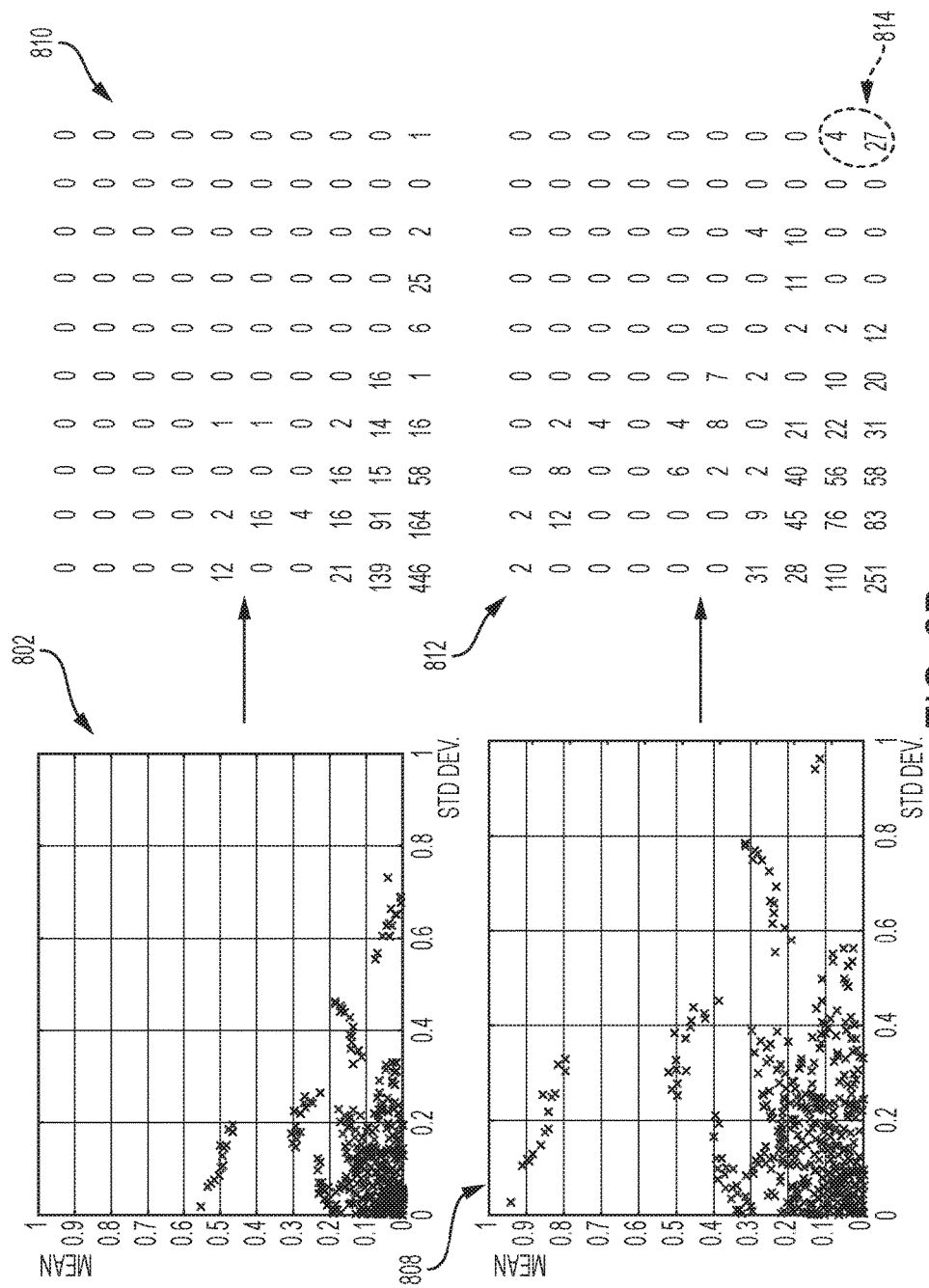

FIGS. 8A-8B are diagrams showing an example process 800 of scaling and renormalizing statistical parameters. The data points of the example plot 802 each represent a value in the matrix 312 of FIG. 3, and represent values for the standard deviation according to Equation (12) on the horizontal axis and the mean according to Equation (11) on the vertical axis. In the example plot 802, each data point value is normalized to values between zero (0) and one (1) based the equation:

$$\text{Normalized}(x_i) = \frac{x_i - \min(X)}{\max(X) - \min(X)} \quad (21)$$

where $x_i$ represents a particular value in the set of values $X = (x_1, x_2, x_3 \ldots x_n)$ for i=1 to n.

In some implementations, a scaling factor may be applied to the normalized statistical parameter values. The scaled statistical parameter values may then be used to generate histogram data for use in a motion detection process. The scaling factor may be based on a signal quality metric for the signal upon which the statistical parameter is based. For example, the scaling factor may be computed as described below with respect to FIGS. 9A-9B. The scaled statistical parameter values are shown in the example plot 804 of FIG. 8A. After scaling, the statistical parameter values are then renormalized such that all statistical parameter values are between zero (0) and one (1). The renormalized values are then used to generate the histogram data used in a motion detection process. The renormalized statistical parameter values are shown in the example plot 806 of FIG. 8A.

As shown in the example plot 804, many statistical parameter values still fall within the range of zero (0) to one (1) after scaling, but some data points may fall outside that range after scaling. For instance, in the example shown, the standard deviation values for the data points 806 are greater than one (1) after the scaling factor has been applied. The renormalization process may disregard the data points 806 in the generation of the histogram data, or may consider the data points 806 in another manner. For example, FIG. 8B shows example histogram data 810, 812 generated based on the values in the example plots 802, 808 (which are the same as plots 802, 808 in FIG. 8A). The example histogram data 810, 812 are generated as described above with respect to the histogram data 404, of FIG. 4. However, in the example shown, the quantity for the bins 814 of the histogram data 812 include additional counts that account for the data points 806 of FIG. 8A that, after scaling, fall outside the range of zero (0) to one (1). The data points 806 may be accounted for in the bins of the histogram data closest to their scaled statistical parameter values. For instance, in the example shown, data points whose scaled standard deviation value is greater than 1 and whose scaled mean value is less than 0.1 are accounted for in the bin of the histogram data 812 at the lower right corner (the bin 814 whose quantity is 27 in FIG. 8B), while data points whose scaled standard deviation value is greater than 1 and whose scaled mean value is between 0.1 and 0.2 are accounted for in the bin of the histogram data 812 just above the lower right corner (the bin 814 whose quantity is 4 in FIG. 8B).

Figure 9A:
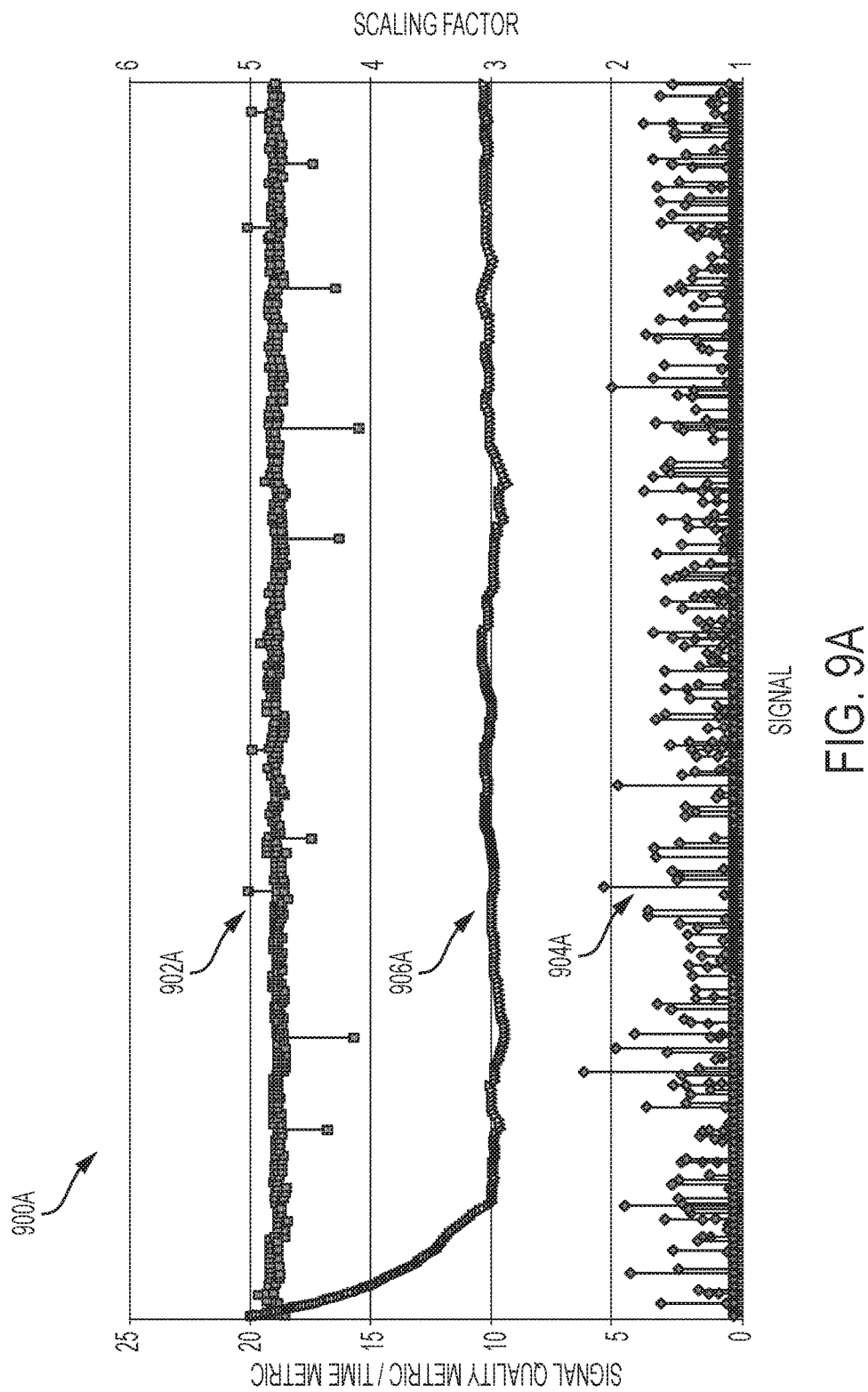
FIGS. 9A-9B are diagrams showing plots of example signal quality metric values, time metric values, and scaling factor values for scaling statistical parameter values of received wireless signals.
Figure 9B:
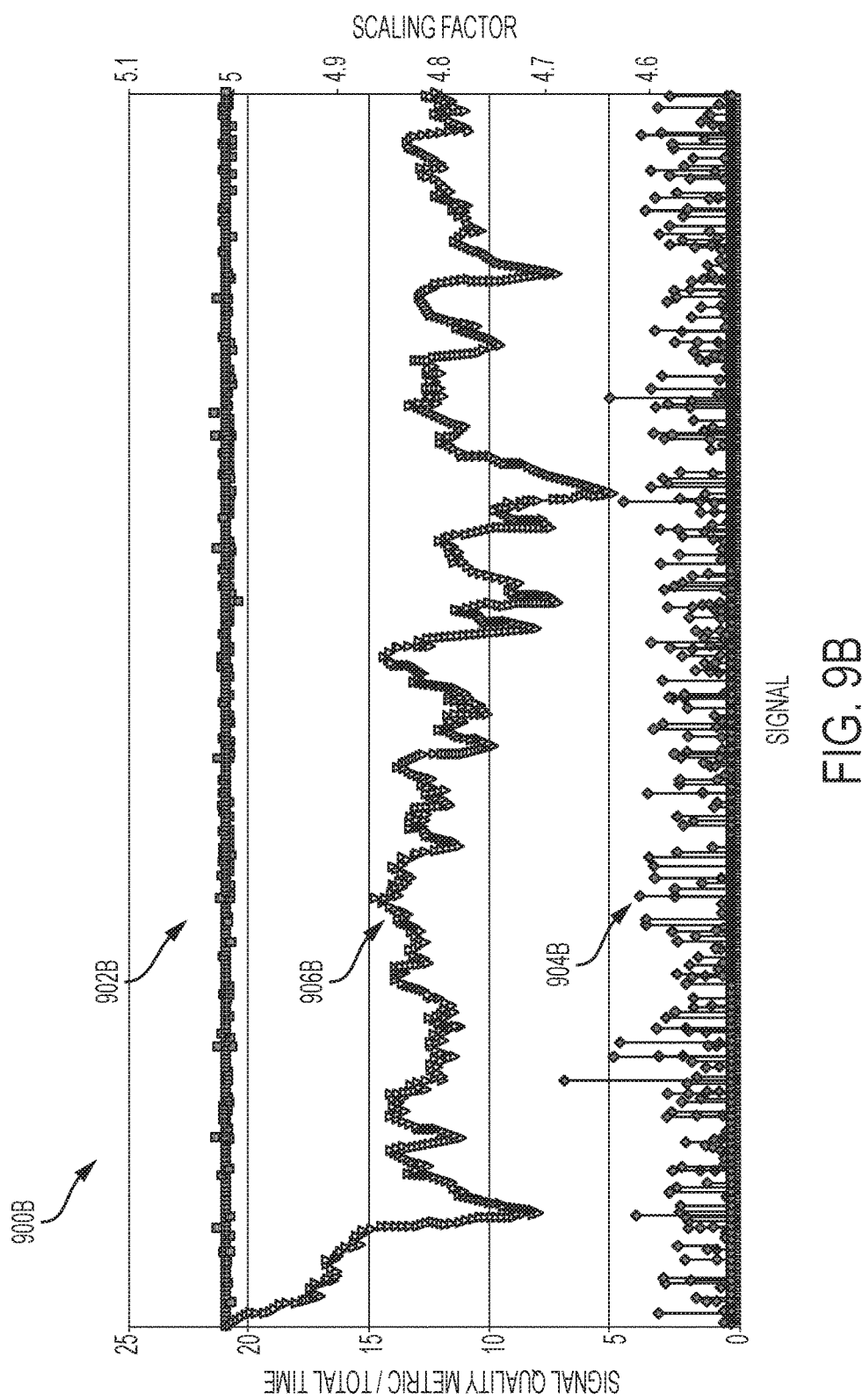

FIGS. 9A-9B are diagrams showing plots 900 of example signal quality metric values 902, time metric values 904, and scaling factor values 906 for scaling statistical parameter values of received wireless signals. In the example shown, the signal quality metric values 902 and the time metric values 904 are interpreted according to the left vertical axis scale (i.e., 0-25), while the scaling factor values 902 are interpreted according to the right vertical axis scale (i.e., 1-6). In some instances, the scaling factor values 906 can be used to scale and renormalize statistical parameter values as described above with respect to FIGS. 8A-8B.

The signal quality metric values 902 may be computed based on (e.g., may be equal to) the value Q described in Equation (9) above, a signal-to-noise ratio (SNR), another value, or a combination thereof. In the example shown, the signal quality metric values 902 increase as the signal/communication channel quality increases. The time factor values 904 may be computed based on an amount of time needed to obtain a sufficient number of wireless signals for inputs to a motion detection process. For example, signals may be accepted or rejected based on their signal quality metric values, and accordingly the amount of time needed to collect accepted signals for the motion detection process may vary. In the example shown, the time factor values 904 increase as the amount of time needed to obtain the sufficient number of inputs increases. The signal quality metric values 902 and time factor values 904 may be computed in another manner.

The example plots 900 illustrate an example relationship between the respective values 902, 904, 906, where the scaling factor values 906 are based on the signal quality metric values 902 and the time metric values 904. For instance, in some examples, the scaling factor values 906 are computed as a function of the signal quality metric values 902 and the time metric values 904. In the examples shown, the scaling factor values 906 increase as the signal quality metric values 902 increase, and the scaling factor values 906 decrease as the time factor values 904 increase. In particular, in the examples shown, the scaling factor values 906 are computed according to the equation $$A(t)=q(t)*dT(t) \tag{22}$$

where $$q(t) = \frac{Q_t}{Q_{target}} \tag{23}$$

and $$dT(t) = \frac{T_t}{T_{target}} \tag{24}$$

with $Q_t$ and $T_t$ referring to the signal quality metric value and time factor value, respectively, at a time t, and $Q_{target}$ and $T_{target}$ referring to a target signal quality metric value and a target time factor value, respectively.

In the examples shown, the signal quality metric values 902A have a target of 21 and the time factor values 904A have a target value of zero (0) (e.g., no delay, no rejected signals). In the example shown in FIG. 9A, when the signal quality metric values 902A are below 21, the scaling factor values 906A are reduced. When the time factor values are above zero (0), the scaling factor values 906A are reduced. The nominal scaling factor value is reached after approximately 600 signals are received and slight variation in the signal quality metric values 902A and time factor values 904A have a marginal impact on the scaling factor values 906A. In the example shown in FIG. 9B, on the other hand, the signal quality metric values 902B are close to the target value of 21, so the time factor values 904B have a more dominant effect on the changes in the scaling factor values 906B.

Figure 10:
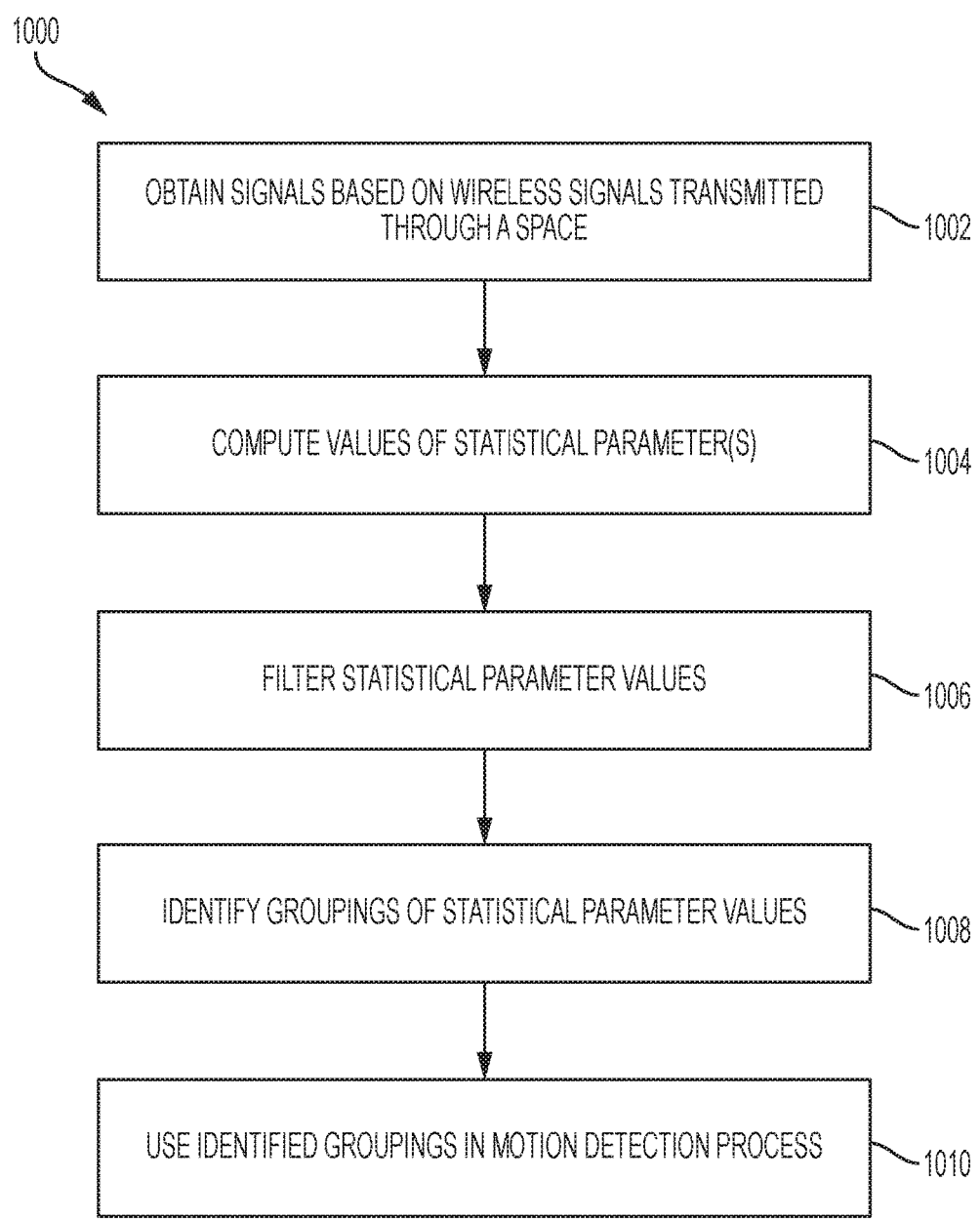
FIG. 10 is a flow diagram showing an example process of detecting motion based on statistical parameters of received wireless signals.

FIG. 10 is a flow diagram showing an example process 1000 of detecting motion based on statistical parameters of received wireless signals. In some instances, the process 1000 may be implemented to detect motion of an object in a space based on signals transmitted on a selected wireless communication channel. Operations in the example process 1000 may be performed by a data processing apparatus (e.g., the processor 114 of the example wireless communication device 102C in FIG. 1) to detect motion based on signals received at wireless communication devices (e.g., wireless communication device 102C of FIG. 1 or the wireless communication devices 204B, 204C of FIGS. 2A-2B). The example process 1000 may be performed by another type of device. For instance, operations of the process 1000 may be performed by a system other than the wireless communication device 102C that receives the signals (e.g., a computer system connected to the wireless communication system 100 of FIG. 1 that aggregates and analyzes signals received by the wireless communication devices 102). The example process 1000 may include additional or different operations, and the operations may be performed in the order shown or in another order. In some cases, one or more of the operations shown in FIG. 10 are implemented as processes that include multiple operations, sub-processes or other types of routines. In some cases, operations can be combined, performed in another order, performed in parallel, iterated, or otherwise repeated or performed another manner.

At 1002, signals are obtained. The signals may be based on wireless signals transmitted through a space between wireless communication devices. For instance, referring to the example shown in FIGS. 2A-2B, the obtained signals may be frequency response information or channel response information determined from wireless signals received at wireless communication devices 204B, 204C, where the wireless signals received at the devices 204B, 204C are based on motion probe signals (e.g., reference or beacon signals) transmitted through the space 200 by the wireless communication device 204A. In some instances, motion probe signals may be transmitted repeatedly or periodically through a space. For instance, referring again to the example shown in FIGS. 2A-2B, the wireless communication device 204A may transmit multiple motion probe signals through the space 200, such that wireless signals based on the motion probe signals are received at various times by the wireless communication devices 204A, 204B.

In some instances, the wireless signals received by the wireless communication devices or the signals obtained from the received wireless signals are compared with quality criteria for a motion detection process. The signals may be accepted or rejected as inputs to the motion detection process based on one or more factors, such as, for example, a signal quality metric (e.g., the value Q described in Equation (9)). For instance, a signal quality metric value may be determined for each of the signals obtained at 1002, and the signal quality metric value may be compared with a threshold to determine whether the signal will be accepted as an input to the motion detection process. If the signal is rejected based on the comparison, it may be disregarded and not processed further (e.g., by the operations described below). On the other hand, if the signal is accepted based on the comparison, it may be further processed as described below.

At 1004, values of one or more statistical parameters are computed for the signals obtained at 1002. The statistical parameters may include a mean, a standard deviation, or another type of statistical parameter of the obtained signals. The statistical parameter values may be computed for each signal obtained at 1002. For instance, referring to the example shown in FIG. 3, each signal obtained at 1002 may be transformed into a frequency-domain representation and frequency components of the frequency-domain representation may be sampled. A mean and standard deviation (or other statistical parameter) may be computed from the sampled frequency components. In some instances, as described above, statistical parameter values may be computed for a subset of the signals obtained at 1002, such as those that are accepted as inputs to a motion detection process based quality criteria.

At 1006, the statistical parameter values are filtered. For instance, in some cases, an initial matrix may be generated that includes the statistical parameter values. The initial matrix may be an auto-correlation matrix, a Toeplitz matrix, or another type of matrix. In some cases, the initial matrix is formatted similar to the matrix 312 of FIG. 3 (e.g., the entries of the initial matrix may include complex values whose real and imaginary components represent a first and second statistical parameter, respectively). In some implementations, the filtering of the statistical parameter values may include performing a singular value decomposition on the initial matrix. For instance, a rotational matrix, a reflection matrix, and an initial set of singular values may be computed from the initial matrix as described above with respect to FIG. 7. A filtered set of singular values may be formed by zeroing a subset of the singular values in the initial set, and a filtered matrix may be constructed from the filtered set of singular values, the rotational matrix, and the reflection matrix. In some implementations, the filtering of the statistical parameter values includes a scaling of the initial matrix. The filtering may also include a renormalization of the statistical parameter values. For example, the filtering process may include a scaling and renormalization similar to the operations described above with respect to FIGS. 8A-8B. In some implementations, scaling is based on scaling factor values that are determined based on signal quality metric values, time factor values, or another metric associated with the signals obtained at 1002. For example, in some instances, the scaling factor values may be determined as described above with respect to FIGS. 9A-9B.

At 1008, groupings of the statistical parameter values computed at 1004 and filtered at 1006 are identified. In some implementations, the groupings may be identified using histogram data for the filtered statistical parameter values. The histogram data may include a set of bins and a quantity for each bin, with each bin corresponding to a respective range for the filtered statistical parameter values. In some cases, the histogram data may be in matrix form. For instance, the histogram data may be similar to the example histogram data matrix 404 of FIG. 4.

At 1010, the groupings identified at 1008 are used in a motion detection process. The motion detection process may detect whether a channel perturbation has occurred based on the groupings of statistical parameter values identified at 1008, and determine whether the channel perturbation is movement of an object in the space or interference. In some cases, the motion detection process includes one or more of the operations described above with respect to FIGS. 5A-5C. For instance, in some implementations, the motion detection process involves one or more check values that are computed based on histogram data (e.g., a matrix similar to the matrix 404 of FIG. 4). As an example, where the histogram data corresponds to a multi-dimensional histogram, the motion detection process may include determining sums of the quantities along each dimension of the histogram, computing check values based on the sums, and comparing the check values with respective thresholds. In some instances, motion signature values may be computed based on a set of the check values, and the motion signature values may be compared for respective time periods to identify patterns. The motion signature value patterns may identify a type of channel perturbation that occurred in the space (e.g., identify interference versus motion of an object).

In some implementations, the motion detection process includes the computation of a range estimation value. The range estimation value may be used to determine a relative location of detected motion. In some cases, the range estimation value is computed through one or more of the operations described above with respect to FIG. 6. For instance, the range estimation value may be based on a matrix dot product of a matrix representing the histogram data (e.g., the matrix 404 in FIG. 6) and a range scaling matrix whose elements comprise the range scaling values (e.g., the matrix 602 in FIG. 6).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, motion is detected based on statistical parameters of received wireless signals.

In a first example, signals are obtained. The signals are based on wireless signals transmitted through a space and received at a wireless communication device. Values of a set of statistical parameters are computed for each signal, and groupings of the statistical parameter values are identified. A motion detection process is executed by operation of one or more processors. The motion detection process uses the identified groupings to determine whether an object moved in the space.

Implementations of the first example may, in some cases, include one or more of the following features. A frequency-domain representation of the wireless signals received by the wireless communication device may be obtained, and the signals may be generated based on a subset of frequency components in the frequency-domain representation. The set of statistical parameters may include a first statistical parameter and a second statistical parameter, and identifying the groupings may include generating histogram data comprising a set of bins and a quantity for each bin, with each bin corresponding to a respective range for each of the statistical parameters. The first statistical parameter may be the mean and the second statistical parameter may be the standard deviation. Generating the histogram data may include computing the quantity for each bin based on the values for the first and second statistical parameters. The values may be populated into an initial matrix, the initial matrix may be filtered to obtain a filtered matrix, and the histogram data may be generated from the filtered matrix. The entries in the initial matrix may be complex values, with each complex value corresponding to one of the signals and comprises a real component representing the value for the first statistical parameter and an imaginary component representing the value for the second statistical parameter. Filtering the initial matrix may include computing a rotational matrix, a reflection matrix, and an initial set of singular values from the initial matrix by performing a singular value decomposition, forming a filtered set of singular values by zeroing a subset of the singular values in the initial set, and constructing the filtered matrix from the filtered set of singular values, the rotational matrix, and the reflection matrix. Filtering the initial matrix comprises scaling the initial matrix.

Implementations of the first example may, in some cases, include one or more of the following features. The histogram data may correspond to a multi-dimensional histogram, and executing the motion detection process may include determining sums of the quantities along each dimension of the histogram, computing check values based on the sums, and comparing the check values with respective thresholds. Executing the motion detection process may include computing motion signature values based on a set of the check values, and comparing motion signature values for respective time periods. A range estimation value may be computed based on the histogram data and range scaling values, and a relative location of the detected motion may be determined based on the range estimation value. Computing the range estimation value based on the histogram data and the range scaling values may include computing a matrix dot product of a matrix representing the histogram data and a range scaling matrix whose elements comprise the range scaling values.

In a second example, signals are obtained. The signals are based on wireless signals transmitted through a space and received at a wireless communication device. Values of a set of statistical parameters are computed for each signal, and filtered values are obtained by applying a filter to the values of the statistical parameters. The filter includes parameters based on a signal quality analysis of the wireless signals. A motion detection process is executed, by operation of one or more processors, to determine, based on the filtered values, whether an object moved in the space Implementations of the second example may, in some cases, include one or more of the following features. Applying the filter may include computing scaling factors based on the signal quality analysis, and generating the filtered values by applying the scaling factors to the values of the statistical parameters. Values of a signal quality metric may be computed for the respective wireless signals, and computing each scaling factor may be based on the signal quality metric values. Each scaling factor may be based on a ratio of the value of the signal quality metric to a target signal quality metric value. Each scaling factor may be computed further based on an amount of time needed to obtain a sufficient number of the wireless signals for inputs to the motion detection process based on values of the signal quality metric. Each scaling factor may be based on a ratio of a target amount of time to the amount of time needed to obtain a sufficient number of signals for inputs to the motion detection process.

Implementations of the second example may, in some cases, include one or more of the following features. The set of statistical parameters may include a first statistical parameter and a second statistical parameter, the first statistical parameter based on a first function applied to frequency components of the signals, the second statistical parameter based on a second function applied to frequency components of the signals. The first statistical parameter may be the mean and the second statistical parameter may be the standard deviation. A frequency-domain representation of the wireless signals received by the wireless communication device may be obtained, and the signals may be generated based on a subset of frequency components in the frequency-domain representation. Histogram data may be generated from the filtered values. The histogram data may include a set of bins and a quantity for each bin, with each bin corresponding to a respective range for each of the statistical parameters. The motion detection process may use the histogram data to determine whether an object moved. The histogram data may correspond to a multi-dimensional histogram, and executing the motion detection process may include determining sums of the quantities along each dimension of the histogram, computing check values based on the sums, and comparing the check values with respective thresholds. Executing the motion detection process may include computing motion signature values based on a set of the check values, and comparing motion signature values for respective time periods. Generating the histogram data from the filtered values may include renormalizing the filtered values.

In some implementations, a system (e.g., a wireless communication device, computer system or other type of system communicatively coupled to the wireless communication device) includes a data processing apparatus and memory storing instructions that are operable when executed by the data processing apparatus to perform one or more operations of the first or second example. In some implementations, a computer-readable medium stores instructions that are operable when executed by a data processing apparatus to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
   obtaining signals based on wireless signals transmitted through a space and received at a wireless communication device;
   computing, for each signal, values of a set of statistical parameters;
   obtaining filtered values by applying a filter to the values of the statistical parameters, the filter comprising parameters based on a signal quality analysis of the wireless signals; and
   by operation of one or more processors, executing a motion detection process to determine motion detection data, based on the filtered values, indicating whether an object moved in the space; and
   communicating the motion detection data to a device for monitoring movement within the space.

2. The method of claim 1, wherein applying the filter comprises:
   computing scaling factors based on the signal quality analysis; and
   generating the filtered values by applying the scaling factors to the values of the statistical parameters.

3. The method of claim 2, comprising computing values of a signal quality metric for the respective wireless signals, and computing each scaling factor based on the signal quality metric values.

4. The method of claim 3, wherein each scaling factor is based on a ratio of the value of the signal quality metric to a target signal quality metric value.

5. The method of claim 3, comprising computing each scaling factor further based on an amount of time needed to obtain a sufficient number of the wireless signals for inputs to the motion detection process based on values of the signal quality metric.

6. The method of claim 5, wherein each scaling factor is based on a ratio of a target amount of time to the amount of time needed to obtain a sufficient number of signals for inputs to the motion detection process.

7. The method of claim 1, wherein the set of statistical parameters includes a first statistical parameter and a second statistical parameter, the first statistical parameter based on a first function applied to frequency components of the signals, the second statistical parameter based on a second function applied to frequency components of the signals.

8. The method of claim 7, wherein the first statistical parameter is the mean and the second statistical parameter is the standard deviation.

9. The method of claim 1, comprising:
obtaining a frequency-domain representation of the wireless signals received by the wireless communication device; and
generating the signals based on a subset of frequency components in the frequency-domain representation.

10. The method of claim 1, comprising generating histogram data from the filtered values, the histogram data comprising a set of bins and a quantity for each bin, each bin corresponding to a respective range for each of the statistical parameters, wherein the motion detection process uses the histogram data to determine whether an object moved.

11. The method of claim 10, wherein the histogram data corresponds to a multi-dimensional histogram, and executing the motion detection process comprises determining sums of the quantities along each dimension of the histogram, computing check values based on the sums, and comparing the check values with respective thresholds.

12. The method of claim 11, wherein executing the motion detection process comprises computing motion signature values based on a set of the check values, and comparing motion signature values for respective time periods.

13. The method of claim 10, wherein generating the histogram data from the filtered values comprises renormalizing the filtered values.

14. A motion detection system comprising:
a data processing apparatus; and
memory comprising instructions that are operable when executed by the data processing apparatus to perform operations comprising:
obtaining signals based on wireless signals transmitted through a space and received at a wireless communication device;
computing, for each signal, values of a set of statistical parameters;
obtaining filtered values by applying a filter to the values of the statistical parameters, the filter comprising parameters based on a signal quality analysis of the wireless signals; and
executing a motion detection process to determine motion detection data, based on the filtered values, indicating whether an object moved in the space; and
communicating the motion detection data to a device for monitoring movement within the space.

15. The motion detection system of claim 14, wherein applying the filter comprises:
computing scaling factors based on the signal quality analysis; and
generating the filtered values by applying the scaling factors to the values of the statistical parameters.

16. The motion detection system of claim 15, comprising computing values of a signal quality metric for the respective wireless signals, and computing each scaling factor based on the signal quality metric values.

17. The motion detection system of claim 16, wherein each scaling factor is based on a ratio of the value of the signal quality metric to a target signal quality metric value.

18. The motion detection system of claim 16, comprising computing each scaling factor further based on an amount of time needed to obtain a sufficient number of the wireless signals for inputs to the motion detection process based on values of the signal quality metric.

19. The motion detection system of claim 18, wherein each scaling factor is based on a ratio of a target amount of time to the amount of time needed to obtain a sufficient number of signals for inputs to the motion detection process.

20. The motion detection system of claim 14, wherein the set of statistical parameters includes a first statistical parameter and a second statistical parameter, the first statistical parameter based on a first function applied to frequency components of the signals, the second statistical parameter based on a second function applied to frequency components of the signals.

21. The motion detection system of claim 20, wherein the first statistical parameter is the mean and the second statistical parameter is the standard deviation.

22. The motion detection system of claim 14, comprising:
obtaining a frequency-domain representation of the wireless signals received by the wireless communication device; and
generating the signals based on a subset of frequency components in the frequency-domain representation.

23. The motion detection system of claim 14, comprising generating histogram data from the filtered values, the histogram data comprising a set of bins and a quantity for each bin, each bin corresponding to a respective range for each of the statistical parameters, wherein the motion detection process uses the histogram data to determine whether an object moved.

24. The motion detection system of claim 23, wherein the histogram data corresponds to a multi-dimensional histogram, and executing the motion detection process comprises determining sums of the quantities along each dimension of the histogram, computing check values based on the sums, and comparing the check values with respective thresholds.

25. The motion detection system of claim 24, wherein executing the motion detection process comprises computing motion signature values based on a set of the check values, and comparing motion signature values for respective time periods.

26. The motion detection system of claim 23, wherein generating the histogram data from the filtered values comprises renormalizing the filtered values.

27. A computer-readable storage medium storing instructions that are operable when executed by a data processing apparatus to perform operations comprising:
obtaining signals based on wireless signals transmitted through a space and received at a wireless communication device;

computing, for each signal, values of a set of statistical parameters;

obtaining filtered values by applying a filter to the values of the statistical parameters, the filter comprising parameters based on a signal quality analysis of the wireless signals; and executing a motion detection process to determine motion detection data, based on the filtered values, indicating whether an object moved in the space; and communicating the motion detection data to a device for monitoring movement within the space.

28. The computer-readable storage medium of claim 27, wherein applying the filter comprises:

computing scaling factors based on the signal quality analysis; and generating the filtered values by applying the scaling factors to the values of the statistical parameters.

29. The computer-readable storage medium of claim 27, comprising computing values of a signal quality metric for the respective wireless signals, and computing each scaling factor based on the signal quality metric values.

30. The computer-readable storage medium of claim 29, comprising computing each scaling factor further based on an amount of time needed to obtain a sufficient number of the wireless signals for inputs to the motion detection process based on values of the signal quality metric.

* * * * *